(12) United States Patent
Zhu et al.

(10) Patent No.: US 10,681,774 B2
(45) Date of Patent: Jun. 9, 2020

(54) ELECTRONIC DEVICE AND COMMUNICATION METHOD

(71) Applicant: Sony Corporation, Tokyo (JP)

(72) Inventors: Xudong Zhu, Beijing (CN); Zhaocheng Wang, Beijing (CN); Jinhui Chen, Beijing (CN)

(73) Assignee: Sony Corporation, Tokyo (JP)

( * ) Notice: Subject to any disclaimer, the term of this patent is extended or adjusted under 35 U.S.C. 154(b) by 12 days.

(21) Appl. No.: 16/071,827

(22) PCT Filed: Dec. 28, 2016

(86) PCT No.: PCT/CN2016/112585
§ 371 (c)(1),
(2) Date: Jul. 20, 2018

(87) PCT Pub. No.: WO2017/124900
PCT Pub. Date: Jul. 27, 2017

(65) Prior Publication Data
US 2019/0029072 A1    Jan. 24, 2019

(30) Foreign Application Priority Data

Jan. 21, 2016    (CN) .......................... 2016 1 0040661

(51) Int. Cl.
*H04W 88/06*    (2009.01)
*H04W 24/08*    (2009.01)
*G06F 1/16*    (2006.01)
*H04W 40/18*    (2009.01)

(52) U.S. Cl.
CPC .......... *H04W 88/06* (2013.01); *G06F 1/1698* (2013.01); *H04W 24/08* (2013.01); *H04W 40/18* (2013.01)

(58) Field of Classification Search
CPC ..... H04W 88/06; H04W 24/08; H04W 40/22; H04W 48/20; G06F 1/1698
See application file for complete search history.

(56) References Cited

U.S. PATENT DOCUMENTS

| | | | |
|---|---|---|---|
| 2014/0146756 A1* | 5/2014 | Sahin | H04L 1/0025 370/329 |
| 2017/0111280 A1* | 4/2017 | Zhang | H04W 28/16 |
| 2018/0115398 A1* | 4/2018 | Su | H04L 5/0048 |

FOREIGN PATENT DOCUMENTS

| | | |
|---|---|---|
| CN | 101583161 | 11/2009 |
| CN | 102651879 | 8/2012 |
| CN | 102651888 | 8/2012 |
| EP | 2530846 | 12/2012 |
| WO | 201027638 | 11/2010 |

OTHER PUBLICATIONS

English translation of International Search Report dated Mar. 1, 2017 in PCT/CN2016/112585.

* cited by examiner

*Primary Examiner* — Afshawn M Towfighi
(74) *Attorney, Agent, or Firm* — Xsensus LLP

(57) ABSTRACT

An electrical device has processing circuit configured to: select coordinated access points and data distribution center from access points, transmit information about the coordinated access points to the data distribution center, such that in response to the receipt of data from the service gateway, the date distribution center transmits the data to the coordinated access points, and receive the data via the coordinated transmission of the data distribution center and the coordinated access point.

19 Claims, 18 Drawing Sheets

ELECTRONIC DEVICE AND COMMUNICATION METHOD

CROSS-REFERENCE TO RELATED APPLICATION

This application is a national stage (under 35 U.S.C. 371) of International Patent Application No. PCT/CN2016/112585, filed Dec. 28, 2016, claiming priority to Chinese Patent Application No. 201610040661.6, filed Jan. 21, 2016, both of which are herein incorporated by reference in their entirety.

TECHNICAL FIELD

The present disclosure relates to an electronic device and a communication method, and more particularly, the present disclosure relates to an electronic device and a communication method of a coordinated transmission system.

BACKGROUND ART

Driven by new services, applications and devices, data traffic in the future wireless communications is exploding. A user-centric network has been disclosed, which includes a user equipment, a plurality of access points, and a service gateway, wherein the user equipment does not belong to any access point in the communication system and selects one of the access points independently for to provide service for it, for example, in the paper "Routing in user-centric networks", X. Xing, T. Jing, W. Zhou, X. Cheng, Y. Huo and H. Liu, IEEE Commun. Mag vol. 52, no. 9, pp. 44-51, September 2014. The paper considered the case of "there does not always exist a complete stable path from the source to its destination" and tried to find the right relay and form a suitable routing path. In fact, the core idea of this dissertation is that user equipment can be used as a relay to construct a transmission path. However, several algorithms proposed in this dissertation, such as "utilizing human social characteristics", are virtually impractical in the current network.

In addition, in a conventional cell, in order to improve the service quality of the user equipment at the cell edge, a CoMP (Coordinated Multiple Points Transmission/Reception) technique has been proposed. In CoMP technology, for a user equipment at the cell edge, multiple base stations can serve edge user equipments simultaneously through joint transmission (JT). When CoMP is performed for the user equipment, an access point to which the user equipment belongs determines whether to perform CoMP for it. If it is determined to perform CoMP for the user equipment, the access point reports a service gateway and notifies neighboring access points to perform joint transmission. During transmission, the serving gateway transmits the data with the user equipment as destination to each access point, and the access points coordinatively transmit the data to the user equipment.

SUMMARY

In the prior user-centric network, it is hoped that the communication quality of the user equipment can be improved. In the prior CoMP technology, it is desired to improve the communication efficiency of the user equipment.

In view of the above, it is desirable to provide a technical solution to improve the communication quality and communication efficiency of the user equipment.

One aspect of the present disclosure relates to an electronic device, comprising: processing circuitry, configured to: from a plurality of available access points, select one or more available access points as one or more coordinated access points and select one available access point as a data distribution center, transmit information about the one or more coordinated access points to the data distribution center, such that in response to the receipt of data with the electrical device as destination from service gateway, the date distribution center transmit the data with the electrical device as destination to the one or more coordinated access points, and when receiving the data with the electrical device as destination, receive the data with the electrical device as destination via the coordinated transmission of the data distribution center and the one or more coordinated access points.

One aspect of the present disclosure relates to an electronic device, comprising: processing circuitry, configured to: in the case that the electronic device is selected as data distribution center by user equipment, transmit information about the user equipment and the data distribution center to service gateway, receive information about coordinated access points from the user equipment, in response to the receipt of data with the electrical device as destination from the service gateway, transmit the data with the electrical device as destination to the user equipment and the coordinated access points, such that the data with the electrical device as destination is transmit to the user equipment via the coordinated transmission of the data distribution center and the coordinated access points; and in the case that the electronic device is selected as the coordinated access points by the user equipment, in response to the receipt of data with the electrical device as destination, transmit the data with the electrical device as destination to the user equipment, such that the data with the electrical device as destination is transmit to the user equipment via the coordinated transmission of the data distribution center and the coordinated access points.

One aspect of the present disclosure relates to a communication method, comprising: from a plurality of available access points, selecting, by a user equipment, one or more available access points as one or more coordinated access points and select one available access point as a data distribution center, transmitting, by the user equipment, information about the one or more coordinated access points to the data distribution center, such that in response to the receipt of data with the user equipment as destination from the service gateway, the date distribution center transmit the data with the user equipment as destination to the one or more coordinated access points, and when the user equipment receives the data with the user equipment as destination, receiving the data with the user equipment as destination via the coordinated transmission of the data distribution center and the one or more coordinated access points.

One aspect of the present disclosure relates to a communication method, comprising: in the case that the access point is selected as data distribution center by user equipment, transmit, by the data distribution center, information about the user equipment and the data distribution center to service gateway, receive, by the data distribution center, information about coordinated access points from the user equipment, in response to the receipt of data with the user equipment as destination from the service gateway by the date distribution center, transmit, by the date distribution center, the data with the user equipment as destination to the user equipment and the coordinated access points, such that the data with the user equipment as destination is transmit to the user equipment via the coordinated transmission of the data distribution center and the coordinated access points; and in the case that the access point is selected as the coordinated access points by the user equipment, in response to the receipt of data with the user equipment as destination by the coordinated access points, transmit, by the coordinated access points, the data with the user equipment as destination to the user equipment, such that the data with the user equipment as destination is transmit to the user equipment via the coordinated transmission of the data distribution center and the coordinated access points.

In the embodiments of the present disclosure, a coordinated transmission structure of the access points is determined by the user equipment to provide service for it, so that the communication quality of the user equipment can be improved. In addition, in the embodiments of the present disclosure, the serving gateway only needs to transmit the data of the user equipment to the data distribution center, and the data distribution center distributes the data to other coordinated access points. Therefore, the serving gateway does not need to repeatedly transmit data to other coordinated access points, improving the communication efficiency of the user equipment.

DESCRIPTION OF EMBODIMENTS

Figure 1:
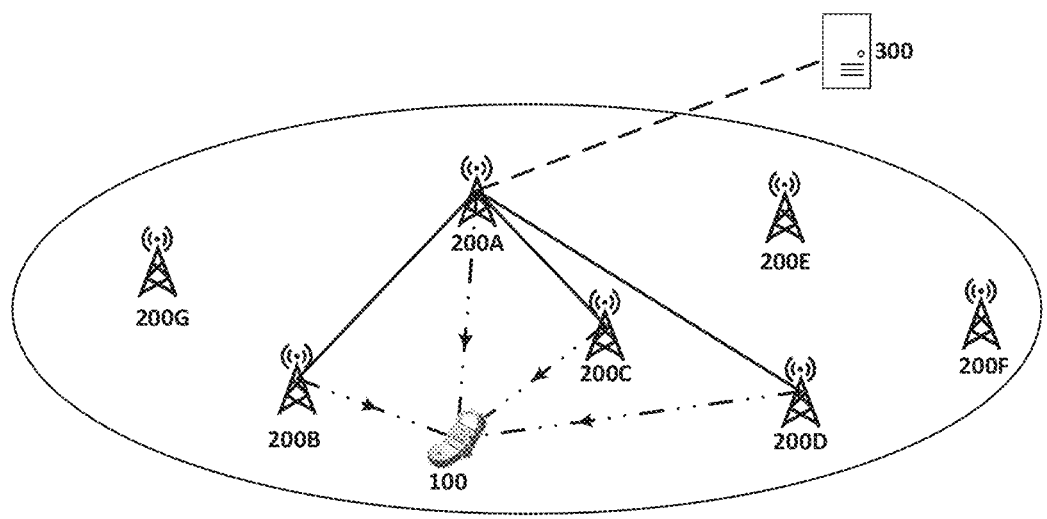
FIG. 1 is an example of a user equipment-centric coordinated transmission system according to an embodiment of the disclosure.

Hereinafter, referring to the drawings, a communication method and an electronic device implementing the communication method according to various embodiments of the present disclosure will be described in the following order.

1. Schematic Configuration of a User Equipment-Centric Coordinated Transmission System According to the Present Disclosure FIG. 1 is an example of a user equipment-centric coordinated transmission system according to an embodiment of the disclosure.

As shown in FIG. 1, the communication system of the present disclosure may include for example a user equipment (UE) 100, a plurality of access points 200 (200A-200G), and a service gateway 300. Among other things, the serving gateway 300 can communicate with the access points 200 and controlling the operation of the access points 200. In addition, the access points 200 may provide services for the UE 100 and perform wireless communication with the UE 100, thereby providing communication between the user equipment 100 and the service gateway 300. In addition, access points 200 may communicate with each other such that access points 200 can coordinate with each other to provide service to UE 100.

In an embodiment of the present disclosure, the UE 100 may be implemented, for example, as a radio device, a mobile phone, a cellular phone, a tablet, a communication terminal, a personal digital assistant, a global positioning device, a personal computer, a laptop computer, a television, a vehicle communication device, an embedded communications processor, or any other communications device that is in wireless network connection with access points 200 and/or a device that operates in conjunction with those devices, or the like. In an embodiment of the present disclosure, the access points 200 may be implemented as, for example, a macro cell (a base station in a macro cell), a micro cell (a base station in a micro cell), a pico cell (a base station in a pico cell), a femto cell (covering home network), a remote radio head (RRH), or any other type of communication device that provides a wireless network connection for the UE. In addition, in the embodiments of the present disclosure, the plurality of access points 200A-200G may be different types of access points.

In the embodiments of the present disclosure, the user equipment 100 and each access point 200 may be connected by, for example, wireless communication. For example, the wireless communication standard may be code division multiple access (CDMA), time division multiple access (TDMA), frequency division duplex (FDD), time division duplex (TDD), Long Term Evolution (LTE), Long Term Evolution-Advanced (LTE-A), Global System for Mobile Communications (GSM), General Packet Radio Service (GPRS), and Frequency Division Multiple Access (FDMA) or similar communication standard. In the embodiments of the present disclosure, the access points 200A-200G may be connected by, for example, various wired and wireless communication methods. For example, wired access through the X2 interface by optical fibers or wireless communications by using a millimeter Wave band may be achieved between the access points. In the embodiments of the present disclosure, the access points 200 and the serving gateway 300 may use wireless backhaul through the S1 interface to implement communication.

In an embodiment of the present disclosure, the UE 100 selects one access point from the surrounding available access points (200A-200G in the present embodiment) as the data distribution center (200A in this embodiment) and selects a plurality of access points as coordinated access points (200B, 200C, and 200D in this embodiment) and establish an structure for coordinated transmission for the UE 100. Upon transmitting data from the serving gateway 300 to the UE 100, the serving gateway 300 firstly transmits the data to the data distribution center 200A. After that, the data distribution center 200A transmits the data to the coordinated access points 200B, 200C and 200D. Finally, the coordinated access points 200B, 200C and 200D together with the data distribution center 200A, in coordination with the data distribution center 200A, to cooperatively transmit the data to the UE 100.

In an embodiment of the present disclosure, a coordinated transmission system established by a user equipment is proposed in which the cooperation manner is no longer determined by the conventional access point but it is the user equipment itself that determines the cooperation manner of the access points providing service for it. Therefore, CoMP technology can be applied to the user equipment-centric network.

In addition, in the user equipment-centric coordinated transmission system according to the embodiment of the present disclosure, the UE 100 selects the data distribution center and coordinated access points to perform coordinated transmission for it so as to establish a coordinated transmission system, and as compared with the conventional CoMP in which the access point of the cell to which the user equipment belongs determined whether and how to transmit the data jointly to the user equipment, it is not necessary for the UE 100 to transmit a measurement report of the state of the surrounding access points to the access points or the serving gateway, thus simplifying the flowpath of the process, shortening the processing time and saving communication resources.

In addition, a user equipment-centric coordinated transmission system of embodiments of the present disclosure utilizes communication between access points 200. In an embodiment of the present disclosure, the UE 100 selects one of the access points as the data distribution center 200A, the serving gateway 300 transmits the data of the user equipment to the data distribution center 200A only, and the data distribution center 200A distributes the data to the coordinated access points 200B, 200C and 200D, which then, together with the data distribution center 200A, transmit the data to the user equipment 100. Therefore, the serving gateway 300 does not have to repeatedly transmit data to the coordinated access points 200B, 200C and 200D. In user equipment-centric networks, wired communications or wireless communications utilizing a large amount of available spectrum, such as in the millimeter-wave band, may be used to enable communication between access points 200 and, thus the data transmission speed between the access points 200 is faster than that achieved by wireless backhaul through the S1 interface between the service gateway 300 and the access points 200. Therefore, in the embodiments of the present disclosure, data of the user equipment 100 is transmitted by the serving gateway 300 to the data distribution center 200A only and distributed by the data distribution center 200A to the coordinated access points 200B, 200C and 200D, and as compared to the repeated transmission of the data of the user equipment 100 by the serving gateway 300 to each of the coordinated access points, the wireless communication resources between the serving gateway 300 and the access points 200 can be saved, the transmission efficiency can be increased, and the data delay can be reduced.

Next, a schematic configuration of a user equipment 100 and an access points 200 according to an embodiment of the present disclosure is described. In addition, the serving gateway 300 in the embodiment of the present disclosure is basically the same as the serving gateway in the related art, and the description of the specific configuration thereof is omitted in the present specification.

1-1. Schematic Configuration of User Equipment 100

Figure 2:
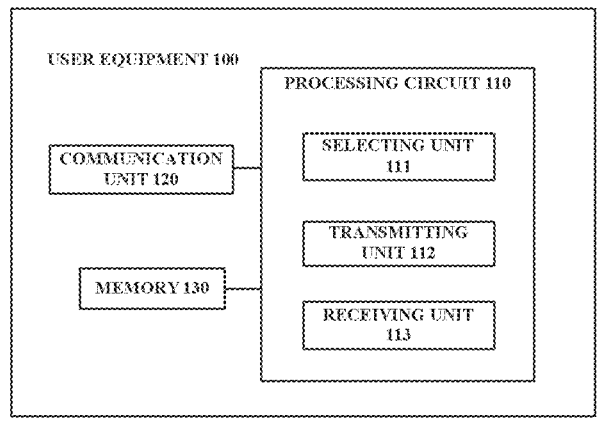
FIG. 2 is a schematic diagram of a configuration of a user equipment according to an embodiment of the present disclosure.

FIG. 2 is a schematic configuration diagram of a UE 100 according to an embodiment of the present disclosure.

The UE 100 according to one embodiment of the present disclosure may include, for example, the processing circuit 110, the communication unit 120, and the memory 130.

The processing circuit 110 of the UE 100 provides various functions of the UE 100. For example, in an embodiment of the present disclosure, the processing circuit 110 of the UE 100 may include a selecting unit 111, a transmitting unit 112, and a receiving unit 113. The selection unit 111 may be configured to select one or more available access points from the plurality of available access points 200 as one or more coordinated access points 200B, 200C and 200D and to select one of the available access points as a data distribution center 200A. The transmitting unit 112 may be configured to transmit information about one or more of the coordinated access points 200B, 200C and 200D to the data distribution center 200A to inform the data distribution center 200A which one or more of the cooperating access points is selected by the user equipment. The receiving unit 113 may be configured to receive data with the electrical device as destination from the data distribution center 200A and the coordinated access points 200B, 200C, and 200D through coordinated transmission of the data distribution center and the coordinated access points.

The communication unit 120 of the UE 100 is configured to perform communication with each access points 200 under the control of the processing circuit 110. The communication unit 120 transmits, the information to be transmitted by the processing circuit 110 to the access points 200, to the corresponding access points 200 and provides the information received from each access point 200 to the processing circuit 110.

In an embodiment of the present disclosure, for example, the communication unit 120 may be implemented as an antenna device, and the transmitting unit 112 and the receiving unit 113 may be implemented as communication interface components such as a radio frequency circuit, a baseband processor, and the like.

The memory 130 may store information generated by the processing circuit 110, information received from the access points 200 through the communication unit 120, and programs and data for the operation of the UE 100. Memory 130 may be a volatile memory and/or a non-volatile memory. For example, the memory 130 may include, but is not limited to, random access memory (RAM), dynamic random access memory (DRAM), static random access memory (SRAM), read only memory (ROM), and flash memory.

1-2. Schematic Configuration of Access Point 200

Figure 3:
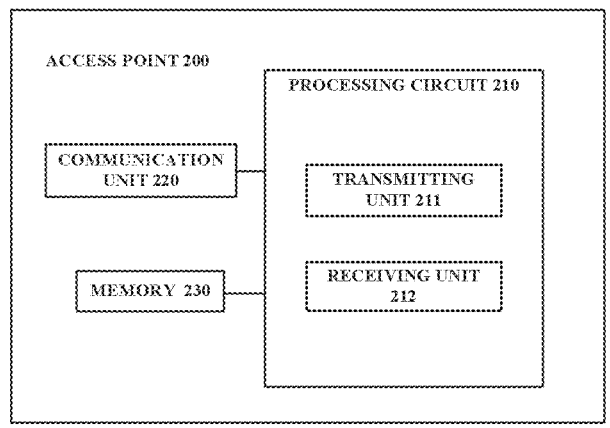
FIG. 3 is a schematic diagram of a configuration of an access point according to an embodiment of the present disclosure.

FIG. 3 is a configuration diagram of an access point 200 according to an embodiment of the present disclosure.

The access point 200 according to one embodiment of the present disclosure may include, for example, the processing circuit 210, the communication unit 220, and the memory 230.

The processing circuit 210 of the access point 200 provides various functions of the access point 200. For example, the processing circuit 210 of the access point 200 may include a transmitting unit 211 and a receiving unit 212. The processing circuit 210 may be configured to operate according to whether the access point 200 itself is selected by the UE 100 as a data distribution center or a coordinated access point.

In the case where the access point 200 is selected by the UE 100 as a data distribution center (for example, the access point 200A shown in FIG. 1), the processing circuit 210 may be configured to transmit, by the transmitting unit 211, the information about the UE 100 and information about the access point 200A as the data distribution center of the UE 100 to the serving gateway 300, to inform the service gateway 300 to transmits the information of the UE 100 to the access point 200A when transmitting the information of the UE 100. In addition, the processing circuit 210 may receive information about the other coordinated access points (for example, the access points 200B, 200C and 200D as shown in FIG. 1) from the UE 100 through the receiving unit 212, thereby the access point 200A as the data distribution center and the access points 200B, 200C and 200D as the coordinated access points establish a user equipment-centric coordinated transmission system with the UE 100. When the processing circuit 210 receives the data with the UE 100 as destination from the serving gateway 300, the processing circuit 210 transmits the data with the UE 100 as destination to the UE 100 and the coordinated access points 200B, 200C, 200C and 200D through the transmitting unit 211 so that the data with the UE 100 as destination can be transmitted to the UE 100 through coordinated transmission by the data distribution center 200A and the coordinated access points 200B, 200C and 200D.

In addition, when the access point 200 is selected by the UE 100 as a coordinated access point (for example, access points 200B, 200C and 200D as shown in FIG. 1), the processing circuit 210 is configured to, when receiving the data with the UE 100 as destination from the access point 200A as the data distribution center, transmit data with the UE 100 as destination to the UE 100 via the transmission unit 211 through coordinated transmission with the data distribution center 200A and other coordinated access points.

The communication unit 220 of the access point 200 may be configured to be able to perform communication with the respective UEs 100, other access points 200, and the serving gateway 300 under the control of the processing circuit 210, for example. Specifically, the communication unit 220 may transmit the information transmitted by the transmission unit 211 of the processing circuit 210 to each of the UEs 100, the other access points 200, or the serving gateway 300 to the corresponding destination and provide the information received from each of the UEs 100, other access points 200 or the service gateway 300 to the receiving unit 212 of processing circuit 210.

In an embodiment of the present disclosure, for example, the communication unit 220 may be implemented as an antenna device, and the transmitting unit 211 and the receiving unit 212 may be implemented as communication interface components such as a radio frequency circuit, a baseband processor, and the like.

The memory 230 may store information generated by the processing circuit 210 and information received from the respective UEs 100, other access points 200 or the service gateway 300 through the communication unit 220, and programs and data for the operation of the access point 200. Memory 230 may be a volatile memory and/or a non-volatile memory. For example, the memory 230 may include, but is not limited to, random access memory (RAM), dynamic random access memory (DRAM), static random access memory (SRAM), read only memory (ROM), and flash memory.

2. Processing Flow According to an Embodiment of the Present Disclosure

Figure 4:
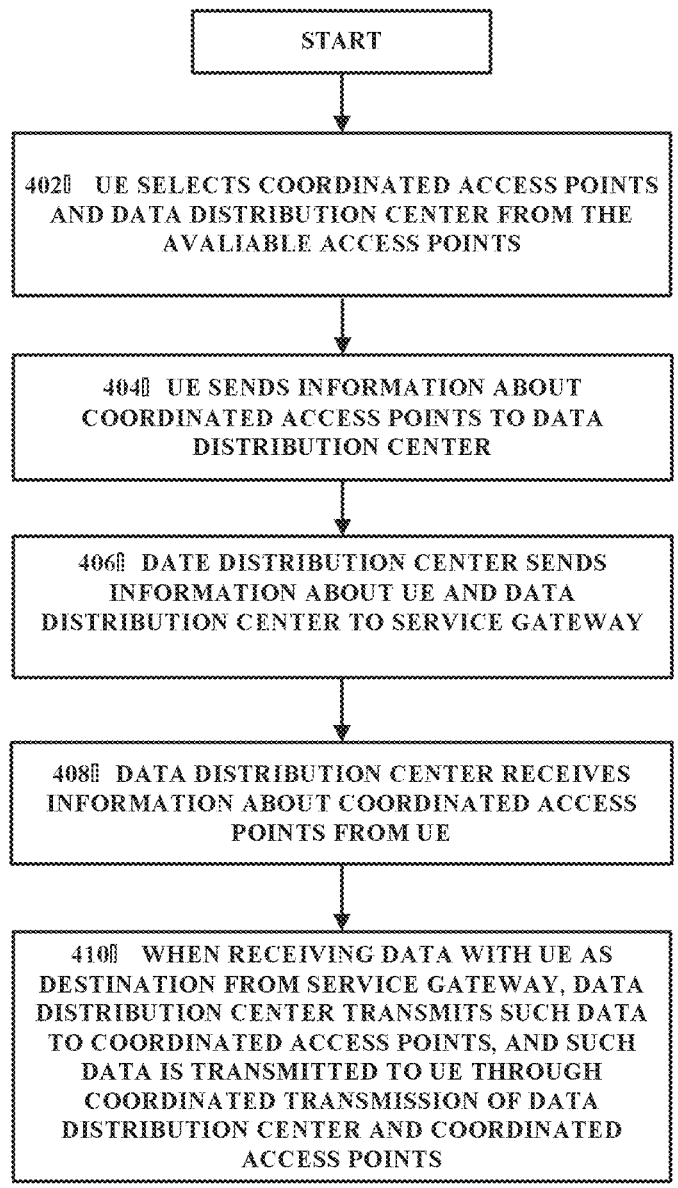
FIG. 4 is one example of a processing flow of a user equipment-centric coordinated transmission system according to an embodiment of the present disclosure.

FIG. 4 is one example of a processing flow of a user equipment-centric coordinated transmission system according to an embodiment of the present disclosure.

In step 402, one or more of the surrounding available access points 200 (eg, access points 200B, 200C and 200D) are selected by the UE 100 as coordinated access points (hereinafter referred to as coordinated access points 200B, 200C, and 200D) and selects one of the surrounding available access points 200 (eg, access point 200A) as a data distribution center (hereinafter referred to as data distribution center 200A). More specifically, one or more coordinated access points and one data distribution center are selected by the processing circuit 110 of the UE 100 from the surrounding available access points 200.

In step 404, the UE 100 transmits information about the coordinated access points 200B, 200C, and 200D to the data distribution center 200A. More specifically, the information about the coordinated access points 200B, 200C and 200D is transmitted by the processing circuit 110 of the UE 100 to the communication unit 220 of the data distribution center 200A through the communication unit 120 and is further provided to the processing circuit 210 of the data distribution center 200A.

In step 406, the information about the UE 100 and the data distribution center 200A is transmitted to the service gateway 300 by the data distribution center 200A. More specifically, the processing circuit 210 of the data distribution center 200A transmits information about the UE 100 and the data distribution center 200A to the serving gateway 300 through the communication unit 220, thereby notifying the serving gateway 300 that when transmitting data to the UE 100, the data with the UE 100 as destination is sent to the data distribution center 200A.

In step 408, information about coordinated access points 200A and 200B is received by the data distribution center 200A from the UE 100. More specifically, the information about the coordinated access points 200A and 200B is received from the processing circuit 110 of the UE 100 through the communication unit 220 and the communication unit 120 of the UE 100 by the processing circuit 210 of the data distribution center 200A.

In step 410, when the data distribution center 200A receives the data with the UE 100 as destination from the service gateway 300, the data distribution center 200A transmits the data to the coordinated access points 200B, 200C and 200D and the data with the UE 100 as destination is then transmitted to the UE 100 through the coordinated transmission of the data distribution center 200A and the coordinated access points 200B, 200C, and 200D. More specifically, when the processing circuit 210 of the data distribution center 200A receives the data with the UE 100 as destination from the serving gateway 300 via the communication unit 220, the processing circuit 210 of the data distribution center 200A transmits, through the communication unit 220, the data with the UE 100 as destination to the coordinated access points 200B, 200C and 200D, and the data with the UE 100 as destination is transmitted to the UE 100 through coordinated transmission of the data distribution center 200A and the coordinated access points 200B, 200C and 200D.

Hereinafter, the specific details of the above processing flow will be explained from the perspective of the UE 100 and the access points 200, respectively.

2-1. Example of Operation of the User Equipment According to an Embodiment of the Present Disclosure Hereinafter, a specific example of an embodiment according to the present disclosure is provided from the perspective of the UE 100.

Figure 5:
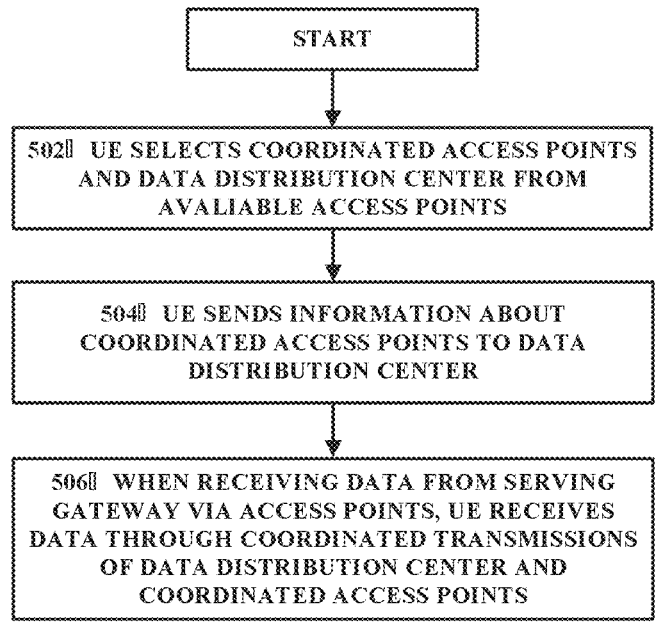
FIG. 5 is an example of a process flow of a user equipment of a user equipment-centric coordinated transmission system according to an embodiment of the present disclosure.

2-1-1. Example of Operation of the User Equipment to Establish a User Equipment-Centric Coordinated Transmission System FIG. 5 is an example of a process flow of a user equipment of a user equipment-centric coordinated transmission system according to an embodiment of the present disclosure. This processing flow is performed by the processing circuit 110 of the UE 100.

In step 502, the selecting unit 111 of the processing circuit 110 of the UE 100 selects one or more access points (eg, access points 200B, 200C and 200D) in the surrounding available access points 200 as the coordinated access points 200B, 200C and 200D, and selecting one of the surrounding available access points 200 (eg, access point 200A) as the data distribution center 200A.

In step 504, the information about the coordinated access points 200B, 200C and 200D is transmitted by the transmission unit 112 of the processing circuit 110 of the UE 100 to the communication unit of the data distribution center 200A through the communication unit 120, so as to be provided to the processing circuit 210 of the data distribution center 200A.

In step 506, when the receiving unit 113 of the processing circuit 110 of the UE 100 receives the data with the UP 100 as destination from the serving gateway 300 via the access points 200 through the communication unit 120, data with the UE 100 as destination is received through the coordinated transmissions of the data distribution center 200A and the coordinated access points 200B, 200C and 200D.

In an embodiment of the present disclosure, before starting the above process, the step of identifying the surrounding available access points 200 may also be included. For example, similar to a traditional cellular network, a legacy base station transmits the information of the base station through a synchronization signal, a reference signal, and a broadcast channel (BCH). The broadcast control channel (BCCH) in the broadcast channel (BCH) is used for the base station to broadcast common information to all user equipments, including various operating parameter information of the cell, reference signals and synchronization signals for the user equipment to measure channel status such as channel quality, channel direction, etc. and identify cell flags. Therefore, the UE 100 can discover the surrounding available access points 200 by receiving the cell identification signal broadcasted by the access points 200 through the communication unit 120. In addition, the UE 100 can discover surrounding available access points 200 using other means known in the art of the present disclosure.

Figure 6:
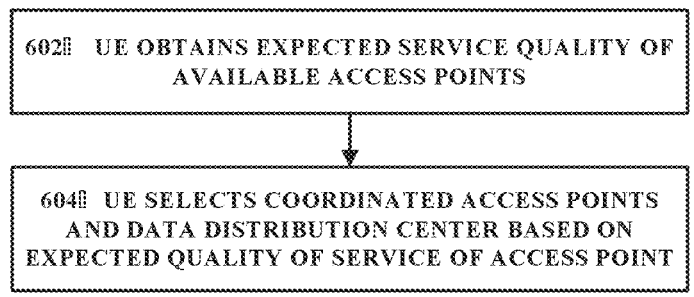
FIG. 6 is one example of a process flow of selecting a data distribution center and coordinated access points by a user equipment according to an embodiment of the present disclosure.

2-1-2. Example of the Operations of the User Equipment to Select the Data Distribution Center and the Coordinated Access Points FIG. 6 is an example of a process flow of selecting a data distribution center and a coordinated access points by a user equipment according to an embodiment of the present disclosure. This processing flow corresponds to step 502 in FIG. 5, and is performed by the selection unit 111 of the UE 100.

In step 602, the processing circuit 110 of the UE 100 obtains the predicted service quality of each available access point 200. In step 604, the processing circuitry 110 of the UE 100 selects one or more access points from the available access points as coordinated access points and selects one access point as the data distribution center based on the predicted service quality of each access point.

The predicted service quality of the access point 200 is an indication of the service quality predicted to be provided by the access point 200 in the event of selection of the access point 200 as an access point for the UE 100. It will be appreciated that as listed below as an example, it is contemplated that the service quality may be determined based on a plurality of parameters and may include aspects that represent the service quality that the access point will provide.

In one embodiment of the present disclosure, the predicted service quality may be based on, for example, the channel quality between the access point and the UE 100, the inherent parameters of the access point, the current status information of the access point, and the the resources of the access point predicted to be allocated to the UE 100.

The channel quality between the access points and the UE 100 is measured by the UE 100 and includes, for example, the strength of the signal received by the UE 100, such as reference signal received strength (RSRP) as measured by the UE 100), and parameters of the channel interference situation between the access points and the UE 100, such as signal to noise ratio (SNR), signal to interference plus noise ratio (SINR), channel quality indicator (CQI), packet loss rate and bit error rate, etc.

The inherent parameters of the access point include the basic parameters of the access point that can be determined after the access point is established and are determined by the basic configuration of the hardware and software of the access point and remain fixed during the operation of the access point, for example, the type, coverage, working ability of access point and so on. More specifically, the types of access points include, for example, a macro cell (a base station in a macro cell), a micro cell (a base station in a micro cell), a pico cell (pico cell), a femto cell (covering the home network), a remote radio head (RRH), or any other type of communication device that provides a wireless network connection for the UE. However, in the embodiments of the present disclosure, some small-sized access points do not have the capability of becoming a data distribution center if they are affiliated with some large-sized access points and can not directly communicate with the service gateway. For example, some access points are directly managed by a macro base station and can communicate with the serving gateway only through a macro base station, and thus can not be a data distribution center. In addition, the working capability of the access point may include, for example, an efficiency of processing data by the access point, whether to support carrier aggregation, whether to support transmission of an unlicensed band, configuration of a MIMO antenna, and the like. The basic parameters of the access point are broadcast by the access point over, for example, a broadcast channel (BCH) and can be obtained by the UE 100.

The current status of the access point includes information indicating the current working status of the access point, for example, load status of the access point, working stability and the like. In addition to the foregoing broadcast channel, the current state of the access point may also be transmitted to the UE 100, for example, by using radio resource control signaling as a bearer and through a physical downlink shared channel (PDSCH), or by using downlink control information (DCI) as a bearer and though physical downlink control channel (PDCCH).

The resources that are predicted to be allocated to the user equipment indicate how many resources the access point plans to provide to the user equipment, including, for example, the processing resources of the access point and the communication transmission resources of the access point, for example, how many resource blocks (RBs) to be provided to the user equipment within one time slot. The information about the resources to be allocated to the user equipment may be transmitted to the UE 100 using, for example, downlink control information (DCI) a bearer and through a physical downlink control channel (PDCCH).

Thus, in addition to the parameters listed above, many other parameters representing the service quality to be provided by the access point may be conceived by those skilled in the art, all of which are included within the scope of the present disclosure.

When the predicted service quality includes a plurality of parameters that represent aspects of the service quality that the access point will provide, when selecting the coordinated access point and the data distribution center in step 604, the various parameters of the predicted service quality can be considered synthetically to determine whether to choose the access point as a coordinated access point or data distribution center. For example, various parameters can be given different priorities, so as to preferentially consider the parameters with higher-priority.

In an alternative embodiment of the present disclosure, the various parameters may be given different priorities so that when selecting the coordinated access point and the data distribution center in step 604, the parameters with higher-priority is more prioritized than the parameters with lower-priority. For a parameter with a certain priority, the UE 100 may predetermine a criterion for the parameter and select an access point that satisfies the criterion, or rank the access points from good to bad according to the parameter and select access points in order.

For example, in one embodiment of the present disclosure, when selecting a coordinated access point, the channel quality between the access point and the UE may be used as a parameter of the first priority for consideration, the resource of the user equipment to be allocated by the access point is taken as a parameter of the second priority, and the intrinsic parameters of the access point and the current status information are taken as the parameters of the third priority.

In this case, the UE 100 may predetermine the criteria for the channel quality of the access point and select all the access points satisfying the criteria as the coordinated access points. Alternatively, the UE 100 may sort the access points according to the channel quality between the access point and the UE, and sequentially select the access points as the coordinated access points. For access points with substantially the same channel quality, the predicted allocation resources of the second priority and the intrinsic parameters and the current state of the access points of the third priority may be reconsidered.

In particular, in an alternative embodiment of the present disclosure, the reference signal received strength (RSRP) of each access point measured by the UE 100 may be used to represent the channel quality between the access point and the UE. RSRP can be divided into six coverage intensity levels, the lower the level, indicating that the greater the intensity. The UE 100 may, for example, predetermine the RSRP criteria of the access point as RSRPs of level 1 and 2, and access points with RSRP of level 1 (RSRP>−65 dBm) and level 2 (−75 dBm<RSRP≤−65 dBm) are all select as a coordinated access points. Alternatively, the LIE 100 may, for example, sort access points according to RSRP levels from low to high and sequentially select access points according to the order thereof. For access points with substantially the same signal reception strength or channel quality, the predicted allocation resources of the second priority and the intrinsic parameters and the current state of the access points of the third priority may be reconsidered.

In addition, in the embodiments of the present disclosure, the two manners of selecting the access point that meets the preset criterion and selecting the access point according to the ordering of the parameters are not mutually exclusive, and may be used in combination. For example, when the number of access points satisfying a preset criterion exceeds a predetermined number of coordinated access points, a predetermined number of coordinated access points may then be selected according to the order of the parameters. For example, when the access points with lower ranks out of the coordinated access points selected according to the parameter ranking can not satisfy the preset criterion, only those access points satisfying the preset criterion may be selected as the coordinated access point according to a preset criterion.

The method of selecting the data distribution center based on the priority of the parameters is similar to the method of selecting a coordinated access point, and the same part will not be described in detail herein. The difference between selecting the coordinated access points and a data distribution center based on their priority is that the number of selected data distribution centers is one, whiler that of the selected coordinated access points are one or more. In addition, for each parameter, the preset criterions for the coordinated access point and the data distribution center may be different. For example, a preset criterion for a data distribution center may be higher than a preset criterion for a coordinated access point.

In addition, it is understood that the above means of selecting the coordinated access point and the data distribution center by synthetically considering the various parameters of the predicted service quality are merely exemplary and not limiting. Those skilled in the art may conceive of many other means of selecting a coordinated access point and data distribution center based on various parameters of the predicted service quality, and these means are also included within the specific embodiments of the present disclosure.

in addition, in the above embodiment, in step 604, the selection of coordinated access points and data distribution centers is performed independently of each other. That is, when the user equipment initially accesses the network, the user equipment may select a coordinated access point and a data distribution center through independent processing flows from each other.

However, in an alternative embodiment of the present disclosure, the selection of the coordinated access points and the data distribution center may be formed successively in step 604. For example, in an embodiment of the present disclosure, when the user equipment initially accesses the network, the user equipment may select the coordinated access point first and then further select the data distribution center from the coordinated access points. For example, the inherent parameters of a data distribution center (type of access point, coverage and capabilities, etc.) may be more important when the user equipment predicts the data distribution center to be as stable as possible, and thus the user equipment may select, based on the inherent parameter of the access point, a data distribution center from the selected coordinated access points. Alternatively, in another embodiment of the present disclosure, the user equipment may first select a data distribution center and then select a coordinated access point from the remaining access points.

In addition, in the above embodiments, for each parameter, the same priority is applied to each parameter when selecting a coordinated access point and a data distribution center.

However, in alternative embodiments of the present disclosure, for each parameter, different priorities may also be used in selecting the coordinated access point and the data distribution center based on the difference between the performance requirements for the coordinated access point and the data distribution center, thereby selecting an access point that is more suitable as a coordinated access point or data distribution center. For example, the inherent parameters of a data distribution center (access point type, coverage, and work capabilities, etc.) may be more important than the predicted allocated resources when the user equipment predicts the data distribution center to be as stable as possible. Therefore, when selecting the distribution center, the priority of the intrinsic parameters of the access point can be increased relative to the predicted allocated resources.

2-1-3. Example of Operation of the User Equipment to Update the Coordinated Access Point The updates of the coordinated access point include the release and addition of coordinated access points by user equipment. After the user equipment-centric coordinated transmission system is established, when the UE 100 discovers that the current service quality of one or more of the coordinated access points is lower than a preset criterion or finds the predicted service quality of the available access point is higher than the current service quality of the current coordinated access point, the user equipment starts to release the original access point. In addition, after releasing the original access point or when the user equipment determines that the coordinated access point needs to be increased, the UE 100 performs a process of adding a new access point.

The current service quality of the coordinated access point is an indication of the service quality currently provided by the coordinated access point for the user equipment. It is to be appreciated that similar to the predicted service quality, the current service quality may also be determined based on a number of parameters and may include aspects that represent the service qualitys currently provided by the coordinated access point, which are not described in detail herein.

Figure 7:
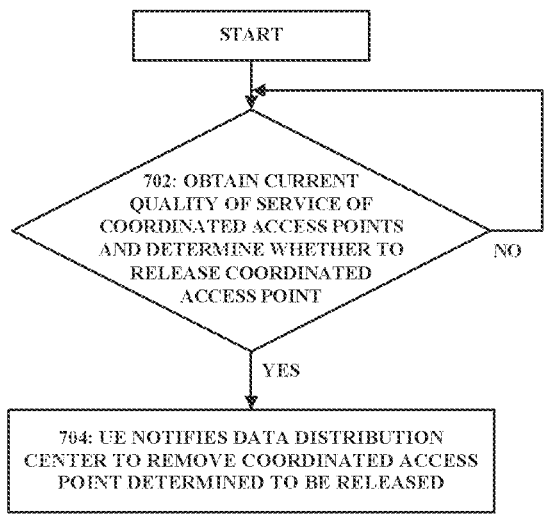
FIG. 7 is a schematic diagram of a process of releasing a coordinated access point by a user equipment according to an embodiment of the present disclosure.

FIG. 7 is a schematic diagram of a process of selecting, by a user equipment, to release a coordinated access point according to an embodiment of the present disclosure. This process flow is performed by the UE 100.

In step 702, the processing circuit 110 of the UE 100 obtains the current service quality of the current coordinated access point and determines whether to release the coordinated access point according to the current service quality of the access point. In step 704, the processing circuit 110 of the UE 100 transmits the information about the released coordinated access point to the data distribution center through the communication unit 120.

In step 702, the processing circuit 110 of the UE 100 determines to release the coordinated access point after the current service quality of the coordinated access point is below a preset threshold for a certain period of time. For example, when the UE 100 finds that the channel quality (eg, RSRP) between the current coordinated access point and the UE 100 is lower than a preset threshold for a certain period of time, it determines to release the coordinated access point.

In addition, in another embodiment of the present disclosure, step 702 further includes the step of obtaining the predicted service quality for each of the available access points 200. Then, if the predicted service quality of the available access point 200 is higher than the current service quality of the current coordinated access point, the processing circuit 110 of the UE 100 determines to release the current coordinated access point and add the available access point 200 as coordinated access point. For example, if the predicted service quality of the available access point 200 is higher than the current service quality of the current coordinated access point by a predetermined threshold and remains above the current service quality of the current coordinated access point by a predetermined threshold for a predetermined period of time, the processing circuit 110 of the UE 100 determines to release the current coordinated access point and newly adds the available access point 200 as a coordinated access point.

Then, in step 704, the UE 100 transmits the information of the current coordinated access point to the data distribution center 300 and notifies the data distribution center 300 to remove the coordinated access point from the user equipment-centric coordinated transmission system, such that when the data distribution center 300 receives the data with the UE 100 as destination again, the data is not transmitted to the released coordinated access point.

Afterwards, when the UE 100 determines to replace the original access point with a new access point or determines to add a new access point based on the original set of coordinated access points, the addition operation of the coordinated access point is performed.

Figure 8:
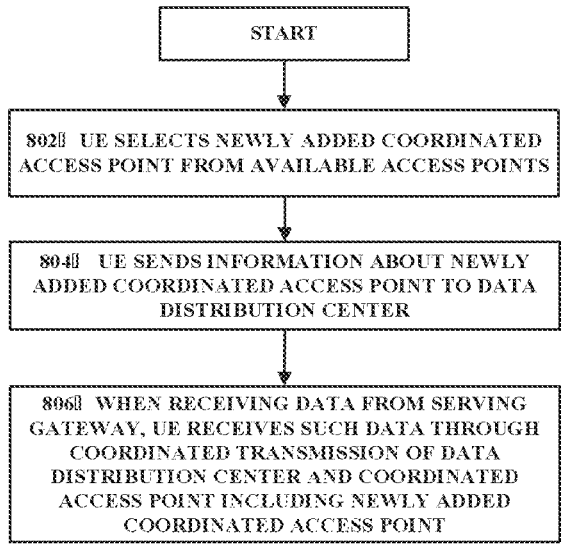
FIG. 8 is a schematic diagram of a process of adding a coordinated access point by a user equipment according to an embodiment of the present disclosure.

FIG. 8 is a schematic diagram of a processing flow of selecting to add a coordinated access point by a user equipment according to an embodiment of the disclosure. This process flow is performed by the UE 100.

In step 802, the UE 100 selects one of the surrounding available access points 200 as a newly added coordinated access point. In step 804, the information about the newly added coordinated access point is sent by the UE 100 to the data distribution center 200A. In step 806, when the UE 100 receives data with the UE 100 as destination from the serving gateway 300, the UE 100 receives the data with the UE 100 as destination through coordinated transmission of the data distribution center and the coordinated access point including the newly added coordinated access point.

The operation performed by the UE 100 in step 802 is similar to the operation of the UE 100 selecting the coordinated access point described with reference to step 502 in FIG. 5 and FIG. 6, which is not described in detail here.

In an exemplary embodiment of the present disclosure, in order to limit the number of coordinated access points, the UE 100 may perform an operation of increasing a coordinated access point only when the original coordinated access point is replaced with a new one, or may set upper limit for the number of coordinated access points based on the specific circumstances and when the number of coordinated access points reached the upper limit, no longer increase the coordinated access points.

Figure 9:
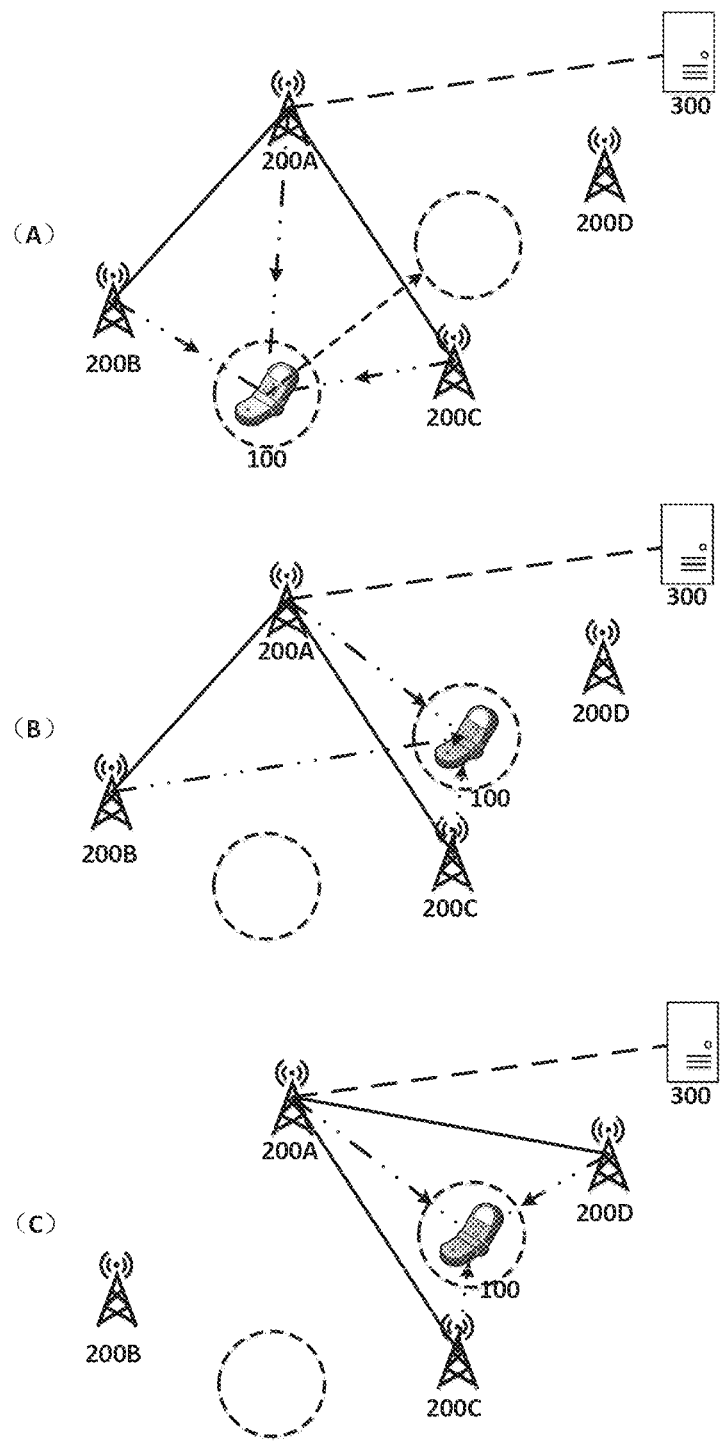
FIG. 9 is a schematic diagram of updating a coordinated access point in a case where a user equipment moves according to an embodiment of the present disclosure.

A typical example of the above situation is when the user equipment leaves the current coordinated access point and approaches another access point in a scenario where the user equipment continuously moves. FIG. 9 is a schematic diagram of updating a coordinated access point while user equipment is moving according to an embodiment of the present disclosure.

In (A) of FIG. 9, for the UE 100, the access point 200A serves as a data distribution center, the access points 200B and 200C serve as coordinated access points, and the access point 200D is remote from the user equipment and is not selected as the coordinated access point of the user equipment.

As shown in (B) of FIG. 9, when the UP 100 moves to another location, its distance from the current coordinated access point 200B increases and the distance from the available access point 200D decreases, and at this time, the UE 100 can obtain the current service quality of the coordinated access point 200B and the predicted service quality of available access point 200D. When the current service quality of the access point 200B is less than the predicted service quality of the access point 200D for a predetermined period of time, the UE 100 may determine to release the coordinated access point 200B and add the access point 200D as a coordinated access point.

After that, as shown in (C) of FIG. 9, the UE 100 notifies the data distribution center 200A to release the coordinated access point 200B and to newly add the coordinated access point 200D to establish a user equipment-centric coordinated transmission system as shown in (C) of FIG. 9.

According to the embodiment of the present disclosure, the dynamic updating mechanism of the access point of the user equipment-centric coordinated transmission system can effectively enable the multi-point cooperation to adaptively adapt the user equipment's continuously moving transmission scenario.

2-1-4. Example of Operation of User Equipment to Switch Data Distribution Center A switching of the data distribution center refers to selecting a new data distribution center in a coordinated access point by the user equipment to replace the current data distribution center. It is understood that the replacement of the data distribution center needs to re-establish the entire coordinated structure, so that when the current service quality of the current data distribution center can meet the requirements, even if there are available access points with higher predicted service quality, the current service quality is not switched. For example, the user equipment may be released only when the current data distribution center cannot meet the service requirement, and then select one of the remaining coordinated access points as the new data distribution center. Specifically, after establishing a user equipment-centric coordinated transmission system, when the UE 100 finds that the current service quality of the data distribution center is deteriorating and unable to meet service requirements, the user equipment starts to replace the data distribution center.

The current service quality of the data distribution center is an indication of the service quality currently provided by the data distribution center to the user equipment. It is to be appreciated that similar to the predicted service quality, the current service quality may also be determined based on a number of parameters and may include aspects that represent the service qualitys currently provided by the coordinated access point, which are not described in detail herein.

Figure 10:
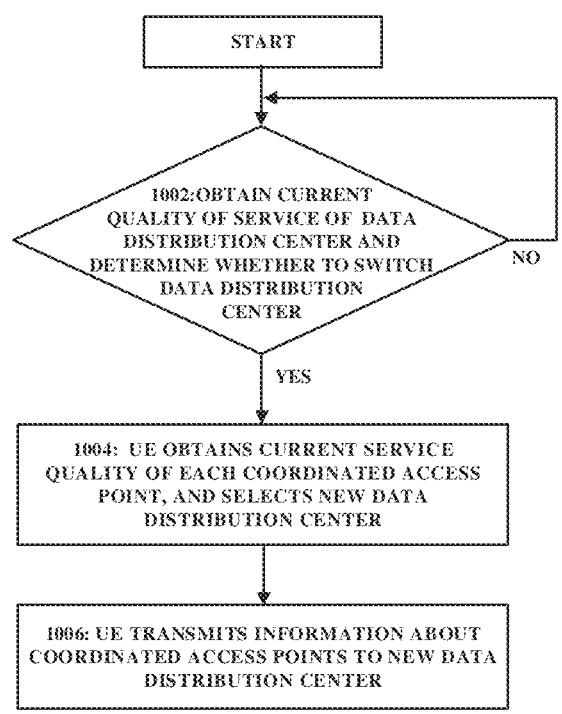
FIG. 10 is a schematic diagram of a processing flow of switching a data distribution center by a user equipment according to an embodiment of the present disclosure.

FIG. 10 is a schematic diagram of a processing flow of selecting switching of a data distribution center by a user equipment according to an embodiment of the present disclosure. This process flow is performed by the UE 100.

At step 1002, the processing circuit 110 of the UE 100 obtains the current service quality of the current data distribution center and determines whether to switch the data distribution center according to the current service quality of the access point. Specifically, after the current service quality of the data distribution center is below a preset threshold for a certain period of time, the processing circuit 110 of the UE 100 determines to switch the data distribution center. For example, after the UE 100 finds that the channel quality (eg, RSRP) between the current data distribution center and the UE 100 is lower than a preset threshold for a certain period of time, it determines to switch the data distribution center.

In step 1004, the processing circuit 110 of the UE 100 selects one of the current coordinated access points as a new data distribution center in response to determining to replace the data distribution center. Specifically, in step 1004, when the processing circuit 110 of the UE 100 determines to switch the data distribution center, the current service quality of each coordinated access point is obtained, and the data distribution center is selected according to the current service quality.

The operation performed by the UE 100 in step 1004 is similar to the process of the UE 100 selecting the data distribution center described in step 502 in FIG. 5 and referring to FIG. 6, which is not described in detail herein. However, the difference between them is that when the UE 100 switches the data distribution center, it selects the data distribution center only from the current coordinated access point, instead of selecting the data distribution center from all the available access points. In addition, at the time of switching the data distribution center, since the coordinated access point is already serving the user equipment, the UE 100 at this time selects a new data distribution center according to the current service quality of the coordinated access point instead of choosing a new data distribution center according to the predicted service quality.

In step 1006, the processing circuit 110 of the UE 100 transmits the information about each of the coordinated access points to the new data distribution center through the communication unit 120, such that upon the receipt of the data with the electronic device as destination, the new data distribution center sends the data to each coordinated access point.

In step 1010, the processing circuitry 110 of the UE 100 releases the original data distribution center. Specifically, the processing circuit 110 of the UE 100 notifies the original data distribution center through the communication unit 120 to stop serving the user equipment and report the relevant information to the serving gateway 300.

Figure 11:
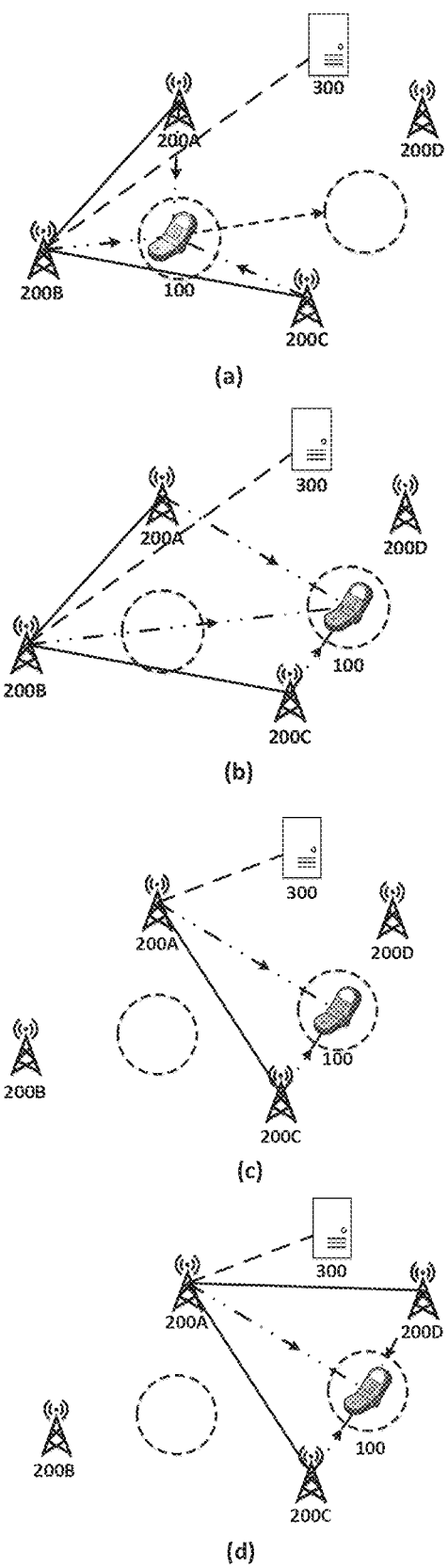
FIG. 11 is a schematic view of switching a data distribution center in a case where a user equipment moves according to an embodiment of the present disclosure.

A typical example of the above situation is when the user equipment leaves the current data distribution center in a scenario where the user equipment continuously moves. FIG. 11 is a schematic view of switching a data distribution center in a case where a user equipment moves according to an embodiment of the present disclosure.

In (A) of FIG. 11, for the UE 100, the access point 200B serves as a data distribution center, the access points 200A and 200C serve as coordinated access points, and the access point 200D is remote from the user equipment and is not selected as coordinated access point or data distribution center of the user equipment.

As shown in (B) of FIG. 11, when the UE 100 moves to another location, its distance from the current data distribution center 200B increases, and at this time the UE 100 may find that the current service quality of the data distribution center 200B falls below a threshold and thus Determined to switch the data distribution center. After that, the UE 100 selects one of the coordinated access points 200A and 200C as a data distribution center.

As shown in (C) of FIG. 11, the UE 100 selects the coordinated access point 200A as a data distribution center, and transmits information about the coordinated access point to a new data distribution center, so that the new data distribution center establishes the user equipment centric coordinated transmission system as shown in (C) of FIG. 11.

In addition, in an alternative embodiment of the present disclosure, the UP 100 may also perform an operation of adding a coordinated access point after switching the data distribution center. For example, as shown in (D) of FIG. 11, the UE 100 may newly add the access point 200D as a coordinated access point.

In the prior art, the user equipment selects an access point with the best channel quality as its service access point, and if it is found that there is a better access point, the access point switching is performed immediately. In this case, it is considered as one switching when the home access point of the user equipment is switched.

In contrast, in the user equipment-centric coordinated transmission system according to the embodiment of the present disclosure, when the coordinated access point of the user equipment is updated, the impact on the service quality of the user equipment is very small, and the update cost is also very low. Only when the data distribution center connected with the serving gateway is switched, the connection between the new data distribution center and the serving gateway needs to be re-established. In this case, it is considered as one switching only when the data distribution center is switched.

In addition, in a user equipment-centric coordinated transmission system according to an embodiment of the present disclosure, since the data distribution center and the plurality of coordinated access points serve the user simultaneously, the degradation of the service quality for the data distribution center may be greatly tolerated. For example, even if the service quality of a data distribution center begins to deteriorate, there is no need to switch the data distribution center because multiple coordinated access points can still provide users with good service quality. In addition, the dynamic update mechanism of the coordinated access point according to the embodiment of the present disclosure can also ensure that a coordinated access point with a higher service quality serves the user, thereby reducing the switching frequency of the data distribution center. In addition, in the embodiment of the present disclosure, the user equipment may start to replace the data distribution center when the service quality of the data distribution center deteriorates to fail to meet the service requirement, thereby reducing the frequency of the switching of the data distribution center.

Therefore, the internal switching mechanism of the data distribution center of the user equipment-centric coordinated transmission system according to the embodiments of the present disclosure can effectively deal with scenarios where the user equipment moves, greatly reducing the number of the switching of the data distribution center and greatly reducing the delay caused by the switching of the data distribution center.

2-2. Example of the Operation of the Access Point According to an Embodiment of the Present Disclosure Hereinafter, a specific example according to an embodiment of the present disclosure is provided from the perspective of the access point 200.

Figure 12:
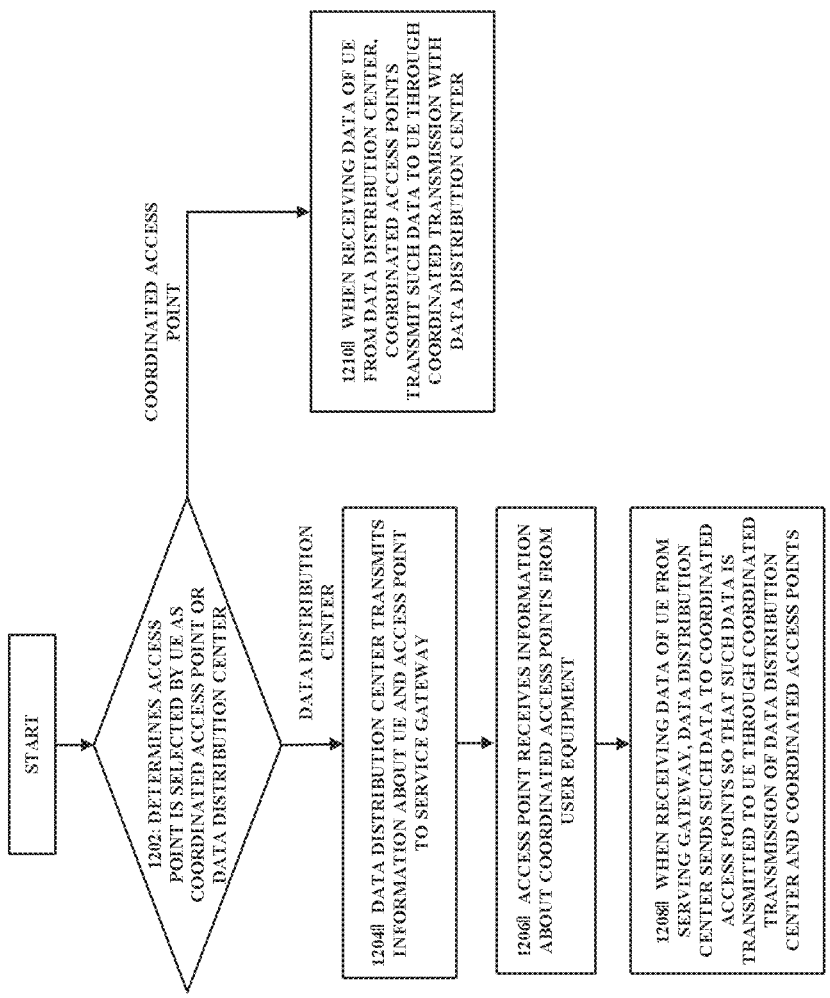
FIG. 12 is one example of a process flow of an access point of a user equipment-centric coordinated transmission system according to an embodiment of the present disclosure.

2-2-1. Example of Operation of the Access Point to Establish a User Equipment-Centric Coordinated Transmission System FIG. 12 is one example of a process flow of an access point of a user equipment-centric coordinated transmission system according to an embodiment of the present disclosure.

In step 1202, the processing circuit 210 of the access point 200 first determines whether the access point 200 is selected by the UE 100 as a coordinated access point or data distribution center. Specifically, the processing circuit 210 of the access point 200 determines whether the access point 200 is selected by the UE 100 as a coordinated access point or data distribution center based on a request received from the UE 110 through the communication unit 220.

In the case where the access point 200 is selected by the UE 100 as a data distribution center, the processing circuit 210 of the access point 200 transmits information about the UE 100 and the access point 200 as a data distribution center to the service gateway 300 in step 1204, thereby notifying the serving gateway 300 to transmit the data with the UE 100 as destination to the access point 200. In an embodiment of the present disclosure, the data distribution center feeds back only information of the served user equipment and its own information to the serving gateway 300 without providing the serving gateway 300 with the information of the coordinated access points serving the user equipment. Therefore, for the serving gateway 300, its operation is similar to that of the user equipment centric network in the prior art, ie, the serving gateway 300 transmits data with the user equipment as destination to a connection point selected by the user equipment, while the operations performed by the data distribution center and the coordinated access point are transparent to the service gateway 300 and do not need to be known.

Thereafter, in step 1206, the processing circuit 210 of the access point 200 receives information about the coordinated access point from the user equipment. Based on the information about the coordinated access point, the access point 200, which is a data distribution center, can communicate with the coordinated access point to confirm the resource scheduling for coordinated transmission to the UE 100. Specifically, in the embodiments of the present disclosure, the data distribution center and the coordinated access point may be conventional base stations, while in traditional cellular networks, communication and signaling interactions are performed by X2 interfaces between base stations, so as to implement mobile support, load management, inter-cell interference coordination and other functions. Thus, information exchange regarding coordinated transmission between the data distribution center and the coordinated access point is enabled through, for example, an X2 interface, to confirm the mutual identity and arrange the resource allocation of the user equipment by the data distribution center in a unified manner, so as to realize the coordinated transmission for the user equipment between the plurality of access points and the data distribution center by using the same resource block.

Afterwards, in step 1208, when the access point 200 receives the data with the UE 100 as destination from the serving gateway 300, the data is sent to the coordinated access point so that the data to the UE 100 is transmitted through the coordinated transmission of the access point 200 which is the data distribution center and the coordinated access points.

When the access point 200 is selected by the UE 100 as a coordinated access point, in step 1210, when the access point 200 receives the data with the user equipment as destination from the data distribution center, under the resource scheduling of the data distribution center, the data is transmitted to the UE 100 through coordinated transmission with the data distribution center.

In an embodiment of the present disclosure, before step 1202, the processing circuit 210 of the access point 200 may further broadcast an identification signal of the access point 200 to the UE 100 through the communication unit 220 for the user equipment to identify the access point 200. In addition, the processing circuit 210 of the access point 200 may also broadcast the inherent parameters of the access point 200 to the UE 100 through the communication unit 220. The intrinsic parameters of access point 200 include one or more of the type of access point, coverage, and working capabilities.

In one embodiment of the present disclosure, prior step 1202, the processing circuit 210 of the access point 200 may also generate and transmit, in response to receiving a request from the user equipment for status information of the access point 200, the current status information of the access point 200 through the communication unit 220. In addition, in one embodiment of the present disclosure, prior to step 1202, the processing circuit 210 of the access point 200 may also generate and notify, in response to receiving a request by the user equipment for resources that the access point 200 predicts to assign to the user equipment, the user equipment of the resource that the access point 200 predicts to assign to the user equipment.

In an embodiment of the present disclosure, the identity of the access point as a data distribution center or a coordinated access point may be determined for one user equipment. That is, the access point may simultaneously become a coordinated access point or data distribution center for multiple user equipments, or the access point may act as a data distribution center for some user equipments and acts as a coordinated access point for some other user equipments at the same time.

2-2-2. Examples of Operations of the Coordinated Access Points and Data Distribution Centers When Updating a Coordinated Access Point In the case of adding a new coordinated access point, the operation performed by the newly added coordinated access point is similar to step 1210 in FIG. 12, and the description thereof is omitted here. In addition, the operation performed by the data distribution center in the case of adding a new coordinated access point is similar to the steps 1204 to 1208 in FIG. 12, and the description thereof is also omitted here.

Figure 13:
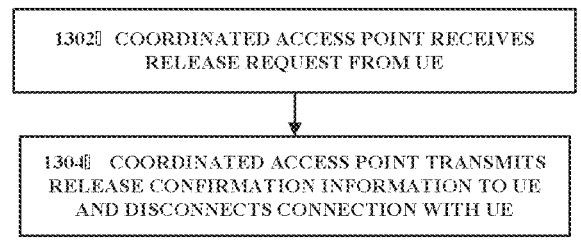
FIG. 13 is a schematic diagram of a process flow performed by a released coordinated access point in the case of releasing a coordinated access point according to an embodiment of the present disclosure.

FIG. 13 is a schematic diagram of a process flow performed by a released coordinated access point in the case of releasing a coordinated access point according to an embodiment of the present disclosure.

At step 1302, the processing circuit 210 of the access point 200 receives a release request from the UE 100 through the communication unit 220. At step 1304, the processing circuit 210 of the access point 200 transmits release confirmation information to the UE 100 through the communication unit 220 and disconnects the connection with the UE 100.

Figure 14:
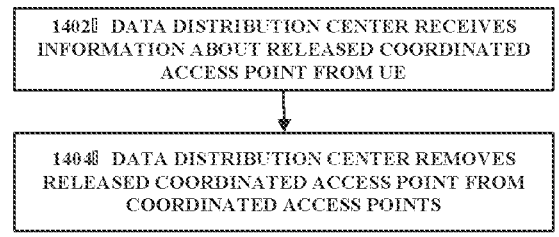
FIG. 14 is a schematic diagram of a process flow performed by a data distribution center in the case of releasing a coordinated access point according to an embodiment of the present disclosure.

FIG. 14 is a schematic diagram of a process flow performed by a data distribution center in the case of releasing a coordinated access point according to an embodiment of the present disclosure.

In step 1402, the processing circuit 210 of the data distribution center 200 receives the information about the released coordinated access point from the UE 100 through the communication unit 210. In step 1404, the processing circuit 210 of the data distribution center 200 removes the released coordinated access point from the coordinated access points.

According to the access point dynamic update mechanism of the user equipment-centric coordinated transmission system according to the present disclosure, which is described in each embodiment of the present disclosure, according to the present disclosure, it is effective to enable coordinated multi-point real-time to adapt to the transmission scenarios in which the user equipment is constantly moving.

2-2-3. Example of Operations of the Data Distribution Center When Switching Data Distribution Center When the data distribution center is switched, the operation of the new data distribution center is similar to the operation described with reference to steps 1202-1208 in FIG. 12, and the description thereof is omitted.

Figure 15:
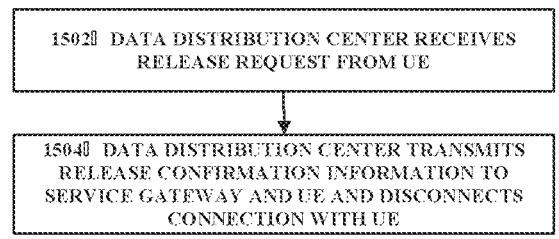
FIG. 15 is a schematic diagram of a process flow performed by an original data distribution center in the case of switching a data distribution center according to an embodiment of the present disclosure.

FIG. 15 is a schematic diagram of a process flow performed by an original data distribution center in the case of switching a data distribution center according to an embodiment of the present disclosure.

In step 1502, the processing circuit 210 of the original data distribution center 200 receives a request to release the data distribution center from the UE 100 via the communication unit 210. In step 1504, the processing circuit 210 of the original data distribution center 200 transmits release confirmation information to the service gateway 300 and the UE 100 via the communication unit 210 and disconnects the connection with the user equipment.

According to the reason discussed in the section 2-1-4 of the present specification, the internal switching mechanism of the data distribution center of the user equipment-centric coordinated transmission system according to the present disclosure described in each of the above embodiments of the present disclosure can efficiently deal with the scenario in which the user equipment is moving, greatly reduce the number of switching of the data distribution center and greatly reduce the delay caused by the switching of the data distribution center.

Figure 16:
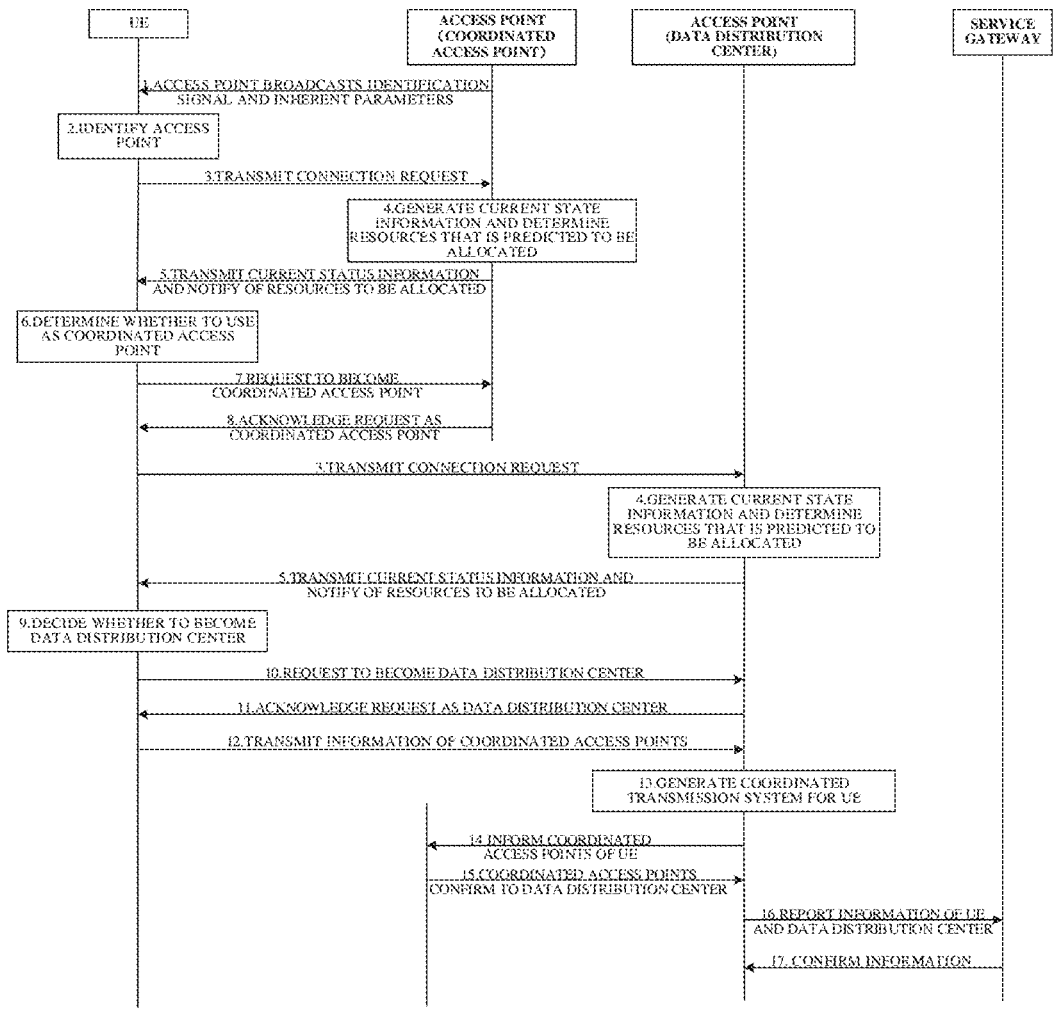
FIG. 16 is one example of a signaling transmission process of a user equipment-centric coordinated transmission system according to an embodiment of the present disclosure.

3. Signaling Transmission Process According to an Embodiment of the Present Disclosure FIG. 16 is one example of a signaling transmission process of a user equipment-centric coordinated transmission system according to an embodiment of the present disclosure. The specific signaling process is as follows:

(1) The access point broadcasts its own identification signal and inherent parameters: the access point broadcasts the cell identification signal so that the UE can discover the access point and determine the channel quality with the access point; and the access point also broadcasts the inherent parameters of the access point, such that the UE can obtain the inherent parameters of the access point, such as the type of access point, coverage, working capability and the like. For example, an access point may transmit synchronization signals as identification signals and broadcast respective intrinsic parameters using a broadcast channel (BCH).

(2) The user equipment identifies the access point that presents in the vicinity by detecting the identification signal of the access point: the user equipment discovers the available access points in the vicinity by receiving and detecting the cell identification signal.

(3) The user equipment transmits a connection request to the identified access point: the user equipment transmits a connection request to the identified available access point, for example, transmits a random access request, and then the access point starts allocating service resources for the user equipment and establishes a data communication connection with the user equipment. For example, the user equipment may perform RRC (radio resource control) connection with the access point through a random access procedure and enter an RRC connection state, thereby establishing a data connection with the access point.

(4) The access point generates the current state information of the access point and determines the resources that is predicted to be allocated for the user equipment.

(5) The access point transmits the current status information of the access point to the user equipment and notifies the user equipment of the resources that are predicted to be allocated to the user equipment. For example, the access point may also transmit the current state information of the access point and information about the resources that are predicted to be allocated to the user equipment to the user equipment by using, for example, radio resource control signaling as a bearer and through a physical downlink share channel (PDSCH), or using downlink control information (DCI) as a bearer and through the physical downlink share channel (PDCCH).

(6). The user equipment determines whether to use the access point as a coordinated access point.

(7). The user equipment transmits a coordinated access point request to the access point. For example, after determining that the access point is a coordinated access point, the user equipment may transmit a coordinated access point request to the access point through a physical uplink control channel (PUCCH).

(8) The access point acknowledges the request as a coordinated access point for the user equipment: the access point feeds back a confirmation message to the requesting user equipment to become its coordinated access point. For example, the access point may feed back confirmation information to the requesting user equipment through a physical downlink control channel (PDCCH).

(9) The user equipment determines whether to use the access point as a data distribution center.

(10) The user equipment transmits a data distribution center request to the access point. For example, after determining that the access point is a data distribution center, the user equipment may transmit a data distribution center request to the access point through a physical uplink control channel (PUCCH).

(11) The access point confirms the request as a data distribution center for the user equipment. For example, the access point may feed back confirmation information to the requesting user equipment through a Physical Downlink Control Channel (PDCCH) to become its data distribution center.

(12) The user equipment transmits the information of the coordinated access point that serves it to the data distribution center. For example, after confirming the data distribution center, the user equipment may report the information of the coordinated access point that serves it to the data distribution center through a Physical Uplink Control Channel (PUCCH).

(13) The data distribution center generates a user equipment-centric coordinated transmission system: after the data distribution center acquires the information of the remaining coordinated access points of the user equipment, a user equipment-centric coordinated transmission structure is locally generated.

(14) The data distribution center informs, the other coordinated access points of the user equipment, of the related cooperation information. For example, the data distribution center may notify the coordinated access points of the user equipment through, for example, the X2 interface, to confirm the resource scheduling for coordinated transmission.

(15) The coordinated access points transmit confirmation message to the data distribution center. For example, the coordinated access points of the user equipment may feedback confirmation information to the data distribution center of the user equipment through, for example, an X2 interface.

(16) The data distribution center reports the information of the user equipment and data distribution center to the serving gateway. For example, after the data distribution center completes the user equipment-centric coordinated transmission system, the data distribution center may report the information of the user equipment and the data distribution center to the service gateway through, for example, the S1-U interface.

(17) The gateway transmits a confirmation message to the data distribution center. For example, after receiving the report of the data distribution center, the serving gateway confirms the structure of the user equipment and the data distribution center and can feedback the confirmation information through, for example, the S1-U interface.

Up to this point, a user equipment-centric coordinated transmission system according to an embodiment of the present disclosure has been established. Thereafter, when the serving gateway transmits data to the user equipment, the data is sent to the data distribution center, and then is sent by the data distribution center to each of the coordinated access points, so that the data is transmitted to the user equipment through the coordinated transmission of the the data distribution center and the coordinated access points.

Figure 17:
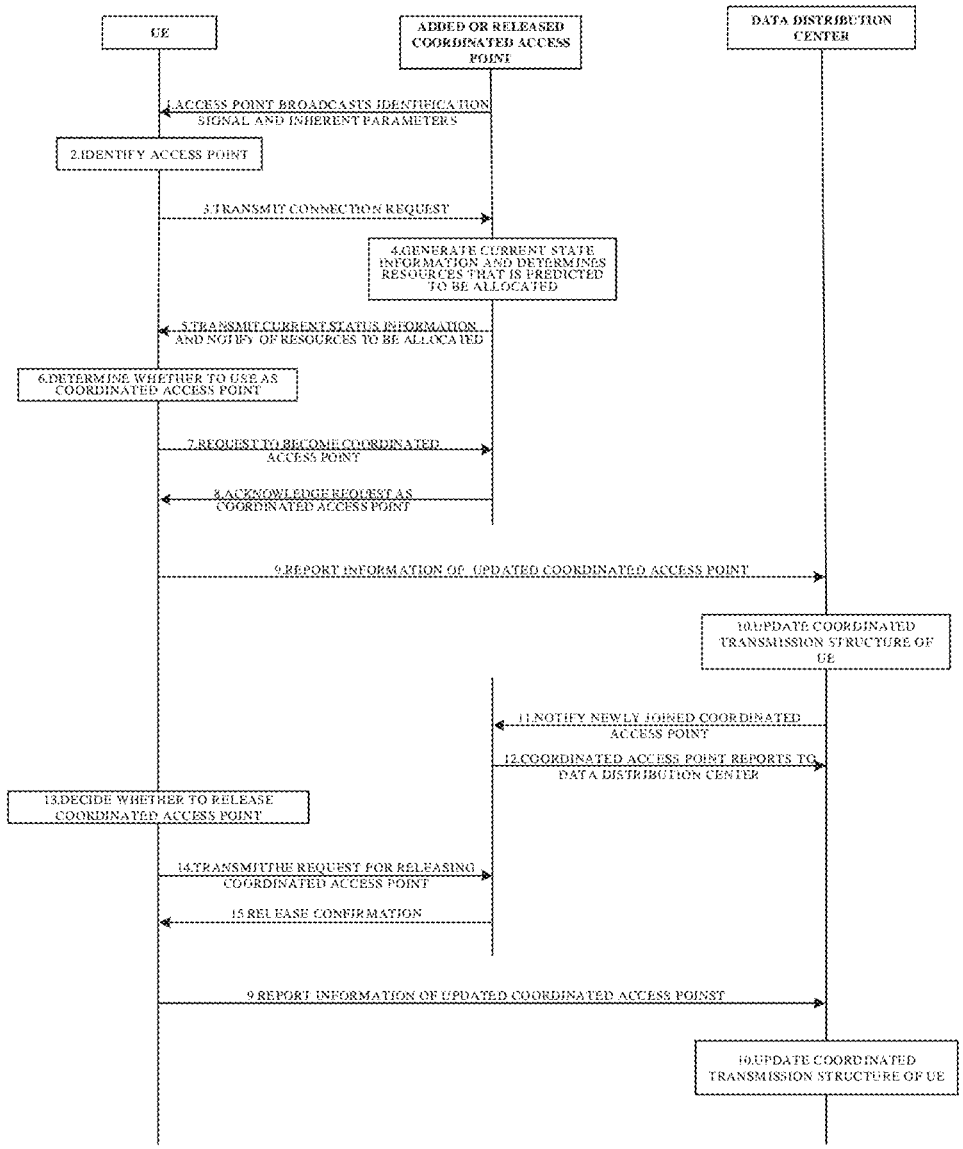
FIG. 17 is one example of a signaling transmission process of updating a coordinated access point according to an embodiment of the present disclosure.

FIG. 17 is one example of a signaling transmission procedure of updating a coordinated access point according to an embodiment of the present disclosure.

The specific signaling procedure for adding a coordinated access point to a user equipment is as follows:

(1)-(8). The user equipment identifies a new access point and joins the existing set of coordinated access points. This part of the process is similar to the signaling process (1)-(8) of the establishment of a user equipment-centric coordinated transmission system as shown in FIG. 16, and thus will not be repeated here.

(9). Report the information of the updated coordinated access point: when the user equipment adds a coordinated access point, the information of the newly added coordinated access point is reported to the data distribution center. For example, the user equipment may report the information of the newly added coordinated access point to the data distribution center through a physical uplink control channel (PUCCH).

(10). Update the coordinated transmission structure of the user equipment: the data distribution center updates the user equipment-centric coordinated transmission structure based on the information of the coordinated access points reported by the user equipment.

(11) Notify the newly joined coordinated access point: the data distribution center will notify the user equipment of the updated coordinated access point to confirm resource scheduling for coordinated transmission. For example, the data distribution center may notify the user equipment of the coordinated access point via, for example, the X2 interface, to confirm resource scheduling for coordinated transmission.

(12) Coordinated access point reports to the data distribution center: the coordinated access point will feedback a confirmation message to the data distribution center of the user equipment. For example, the coordinated access point may feedback confirmation information to the data distribution center via, for example, an X2 interface.

Still referring to FIG. 17, a specific signaling process for the user equipment to release the coordinated access point is as follows:

(13). Determine whether to release the coordinated access point: for a coordinated access point that has already served the user equipment, the user equipment will determine whether to release the coordinated access point based on its service quality.

(14) Transmit the request for releasing the coordinated access point: after determining to release the coordinated access point, the user equipment transmits a release request to the coordinated access point. For example, after determining to release the coordinated access point, the user equipment may transmit a release request to the access point through a physical uplink control channel (PUCCH).

(15) Release confirmation: After receiving a release request from the user equipment, the coordinated access point will terminate service for the user equipment and feedback the release confirmation message. For example, the coordinated access point may feed back release acknowledgment information to the user equipment over a physical downlink control channel (PDCCH).

(9) Report the information of the updated coordinated access poinst: after the user equipment releases the existing coordinated access point, the information of the released coordinated access point is reported to the data distribution center. For example, the user equipment may report the information of the released coordinated access point to the data distribution center over a Physical Uplink Control Channel (PUCCH).

(10) Update the coordinated transmission structure of the user equipment: the data distribution center updates the user equipment-centric coordinated transmission structure based on the information of the coordinated access points reported by the user equipment.

With the signaling procedure shown in FIG. 17, the coordinated access points can be dynamically updated.

Figure 18:
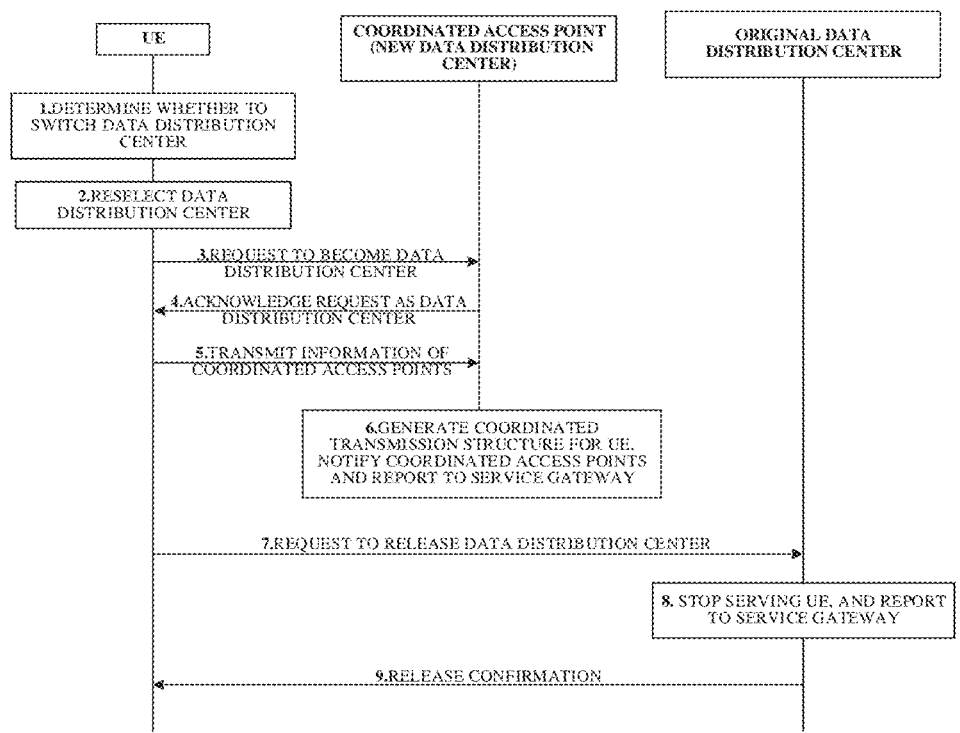
FIG. 18 is one example of a signaling transmission process of switching a data distribution center according to an embodiment of the present disclosure.

FIG. 18 is one example of a signaling transmission process of switching the data distribution center according to an embodiment of the present disclosure. The specific signaling process is as follows:

(1). Determine whether to switch the data distribution center: the user equipment determines whether to switch the data distribution center by monitoring the service quality of the data distribution center.

(2) Reselect the data distribution center: the user equipment selects a new data distribution center from the coordinated access points based on the current service quality of the coordinated access points.

(3)-(6). The user equipment requests the coordinated access point to be a new data distribution center and transmits the information of other coordinated access points to the new data distribution center. The new data distribution center generates the user equipment-centric coordinated transmission structure, notify the coordinated access points and reports to the service gateway. This part of the process is similar to (10)-(17) of the signaling transmission process shown in FIG. 16, and will not be repeated here.

(7) Request to release the data distribution center: the user equipment transmits a release request to the original data distribution center. For example, the user equipment may transmit a release request to the original data distribution center through a physical uplink control channel (PUCCH).

(8) Stop the service of the original data distribution center: the original data distribution center stops serving the user equipment, and reports the relevant information to the service gateway.

(9) Release confirmation: the original data distribution center transmits a release confirmation message to the user equipment. For example, the original data distribution center may feedback the release acknowledgment to the user equipment through a Physical Downlink Control Channel (PDCCH).

With the signaling procedure shown in FIG. 18, the data distribution center can be dynamically switched.

Figure 19:
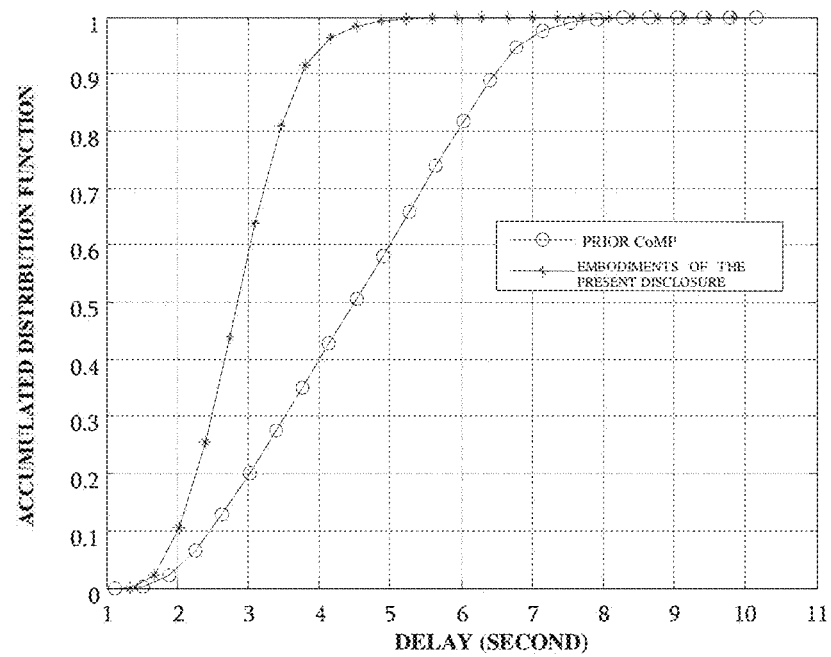
FIG. 19 is a simulation diagram of transmission delaies of a user equipment-centric coordinated transmission system and a conventional CoMP technology according to an embodiment of the present disclosure.

4. Simulation of the User Equipment-Centric Coordinated Transmission System According to an Embodiment of the Present Disclosure FIG. 19 compares the transmission delay of a user equipment-centric coordinated transmission system according to an embodiment of the present disclosure and a conventional CoMP technique. Here we assume that there are 3 access points for coordinated transmission, where the legacy CoMP is provided by three eNBs to provide coordinated transmission, and the user equipment-centric coordinated transmission system according to an embodiment of the present disclosure consists of one data distribution center and two coordinated access points to provide coordinated transmissions. In the 1000 m*1000 m square region, assuming that there are 10 randomly distributed user equipments, the delays of multiple data transmissions from the serving gateway to 10 users are calculated by simulation, and a probability distribution function graph of transmission delays is obtained. The transmission delays of the user equipment-centric coordinated transmission system according to the embodiment of the present disclosure and the conventional CoMP technique are then compared by comparing probability distribution functions.

Assume that each user equipment needs to receive a packet of the size 20 Mb. Assume that the service gateway has a 20 MHz transmission bandwidth and a transmission rate of 5 bps/Hz for transmitting data to the access point. Therefore, when transmitting data of the size 20 Mb from the serving gateway to one access point, the data transmission delay is: 20 Mb/(5 bps/Hz*20 MHz), where 20 Mb is the packet size and 5 bps/Hz is rate from the service gateway to access point, and 20 MHz is the service gateway transmission bandwidth. After that, the transmission delay from the access point to the user equipment is 20 Mb/(r bps/Hz*5 MHz), where r bps/Hz represents the transmission rate from the access point to the user equipment, and 5 MHz represents the transmission bandwidth.

In traditional CoMP technology, data packets of the size 20 Mb need to be transmitted from the serving gateway to three access points. Therefore, the data transmission delay from the serving gateway to the three access points is approximately three times of the data transmission delay from the service gateway to one access point, ie 3*20 Mb/(5 bps/Hz*20 MHz).

In the user equipment-centric coordinated transmission system according to the embodiment of the present disclosure, the service gateway only needs to transmit data packets of the size 20 Mb to the serving gateway without transmitting the data packet to other coordinated access points. The data transmission delay from the service gateway to the data distribution center is only 20 Mb/(5 bps/Hz*20 MHz).

In addition, in the user equipment-centric coordinated transmission system of the embodiment of the present disclosure, since the distance between the data distribution center and the coordinated access point is very close, the communication therebetween can be performed through the faster wire communication or the short-range millimeter wave frequency band, so the data transmission delay from the data distribution center to the coordinated access point is much smaller than the above data transmission delay, and can be substantially ignored when calculating the transmission delay from the serving gateway to the user equipment. For the existing millimeter wave hand, the commonly used frequency band is, for example, Ka band (26.5 GHz to 40 GHz), and the available bandwidth is large (GHz-class bandwidth), which therefore, as compared to the bandwidth at the MHz level (5 MHz in the above simulation) of the conventional frequency 1 to 3 GHz band used between the service gateways to the access points and between the access points to the user equipments, is undoubtedly huge, so the data transmission rate may be nearly a thousand times larger. In addition, the directional transmission technology in the millimeter wave transmission technology can realize the simultaneous transmission of the same frequency to the coordinated access points in different directions by the data distribution center, ie, parallel transmission, thereby further improving the data transmission rate from the data distribution center to the coordinated access point.

So, in general, in the traditional COMP technology, the transmission delay from the serving gateway to the user equipment is about 3*20 Mb/(5 bps/Hz*20 MHz)+20 Mb/(r bps/Hz*5 MHz), while in a user equipment-centric coordinated transmission system according to an embodiment of the present disclosure, the transmission delay from the serving gateway to the user equipment is approximately 20 Mb/(5 bps/Hz*20 MHz)+20 Mb/(r bps/Hz*5 MHz). It is obvious that the user equipment-centric coordinated transmission system of the embodiments of the present disclosure can significantly reduce the transmission delay from the serving gateway to the user equipment.

It can also be seen from the simulation result of FIG. 19 that the technical solution according to the embodiment of the present disclosure can greatly reduce the transmission delay from the serving gateway to the user equipment.

It can be seen that according to embodiments of the present disclosure, multi-point coordinated data transmission is achieved by utilizing short-distance millimeter-wave transmission between access points, which greatly saves transmission resources from the service gateway to the access point.

Figure 20:
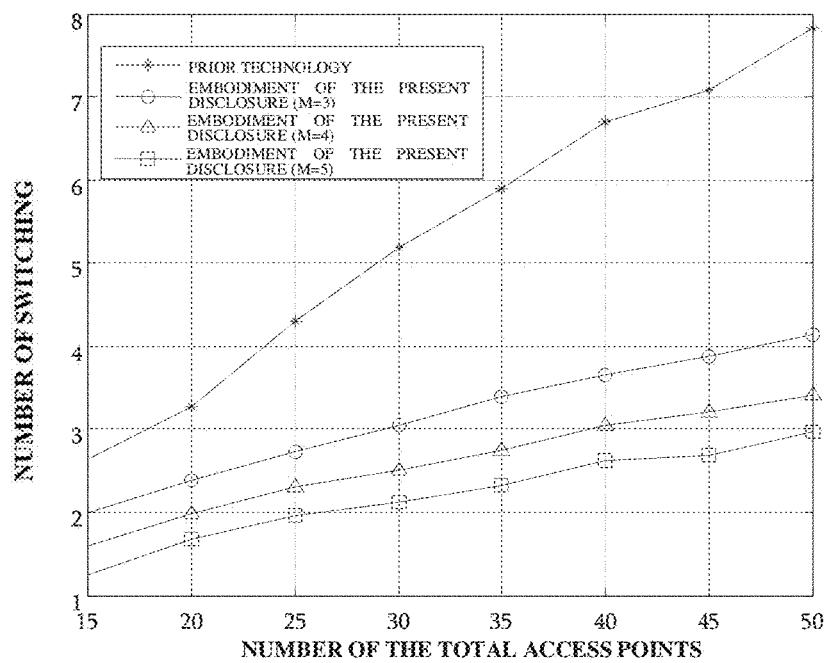
FIG. 20 is a simulation diagram of the number of switching the access points of a user equipment-centric coordinated transmission system according to an embodiment of the present disclosure and that in the prior art.

FIG. 20 compares the number of switching the access points of the user equipment-centric coordinated transmission systems according to an embodiment of the present disclosure and tha tin the prior art when the user equipment moves through an area where N access points are randomly distributed.

In the prior art, the user equipment selects an access point with the best channel quality as its service access point, and if it is found that there is a better access point, the access point switching is performed immediately. In this case, the change of the access point to which the user equipment belongs is considered as one switching.

In contrast, in the user equipment-centric coordinated transmission system according to the embodiment of the present disclosure, when the coordinated access point of the user equipment is updated, the impact on the service quality of the user equipment is very small, and the update cost is also very low as well. Only when the data distribution center connecting to the service gateway is switched, the connection between the new data distribution center and the serving gateway needs to be re-established. In this case, only the switching of the data distribution center is considered as one switching.

According to an embodiment of the present disclosure, in a user equipment-centric coordinated transmission system according to an embodiment of the present disclosure, the number of switching of the data distribution center is reduced. Therefore, in the case where the number of coordinated access points is M, since the time for the data distribution center to keep providing service for the user equipment will be extended accordingly, the number of switching of the data distribution center can be effectively reduced.

As shown in FIG. 20, it can be found that, under the setting of N=40 and M=3, in the user equipment-centric coordinated transmission system according to the embodiment of the present disclosure, the number of switching of the data distribution center is only half of that in the traditional scheme. At the same time, as the number of coordinated access points M increases, the number of switching can be further reduced.

5. Application Example

Technology according to one or more of the embodiments of the present disclosure is applicable to various products.

For example, the user equipment 100 may be realized as a mobile terminal such as a smartphone, a tablet personal computer (PC), a notebook PC, a portable game terminal, a portable/dongle type mobile router, and a digital camera, or an in-vehicle terminal such as a car navigation device. The user equipment 100 may also be realized as a terminal (that is also referred to as a machine type communication (MTC) terminal) that performs machine-to-machine (M2M) communication. Furthermore, the user equipment 100 may be a module (such as an integrated circuit module including a single die) mounted on each of the terminals.

For example, the access point 200 may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the access point 200 may be realized as any other types of base stations such as a NodeB and a base transceiver station (BTS). The access point 200 may include a main body (that is also referred to as a base station device) configured to control radio communication, and one or more remote radio heads (RRH) disposed in a different place from the main body. Additionally, various types of terminals to be discussed later may also operate as the access point 200 by temporarily or semi-permanently executing a base station function.

For example, the service gateway 300 may be realized as any type of server such as a tower server, a rack server, and a blade server. The service gateway 300 may be realized in a module (such as an integrated circuit module including a single die, and a card or a blade that is inserted into a slot of a blade server) mounted on a server.

5-1. Applications Related to User Equipment (First Application)

Figure 21:
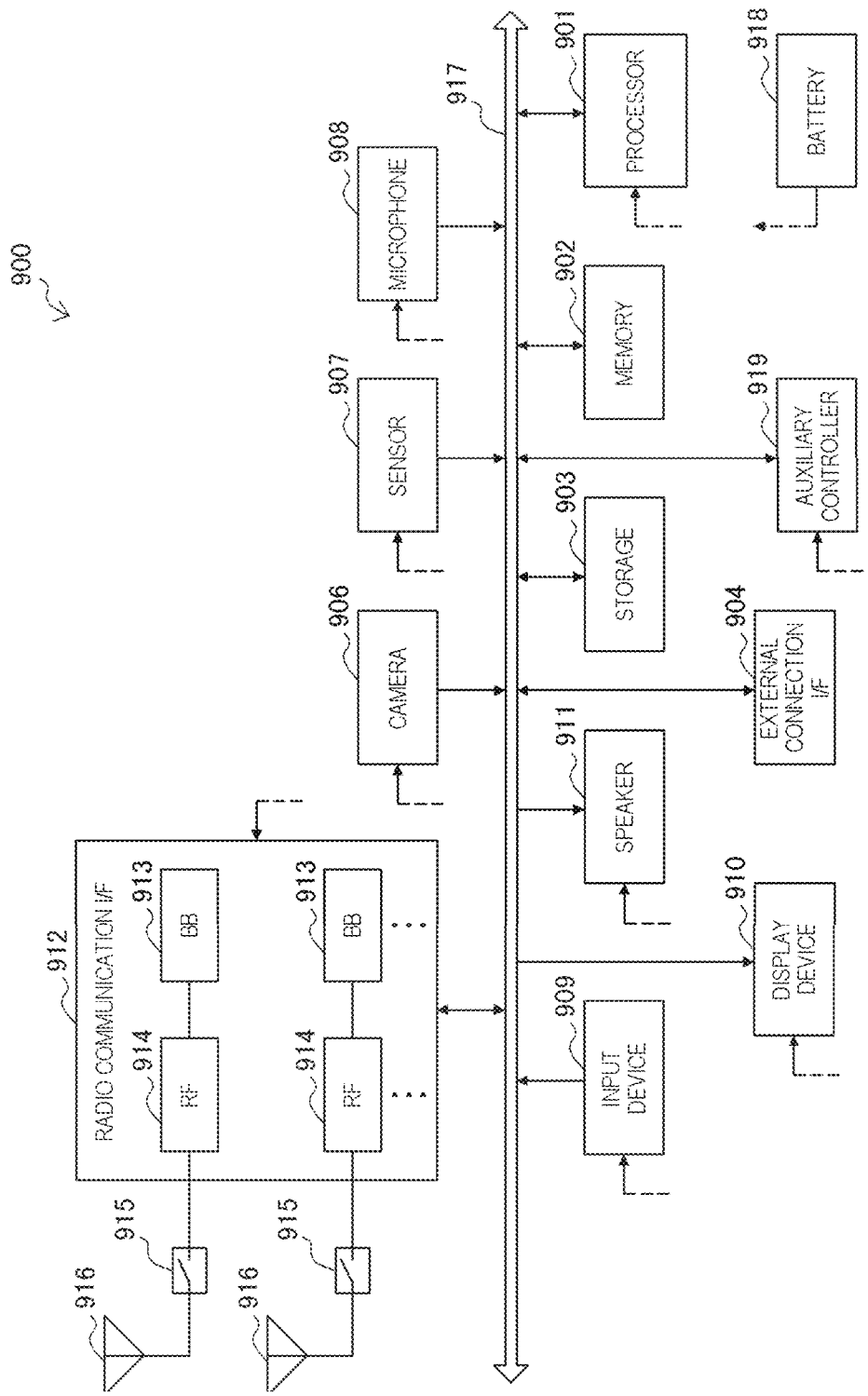
FIG. 21 is a block diagram illustrating an example of a schematic configuration of a smartphone according to an embodiment of the present disclosure.

FIG. 21 is a block diagram illustrating an example of a schematic configuration of a smartphone 900 to which an embodiment of the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 21. Although FIG. 21 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 21. Although FIG. 21 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 21 via feeder lines, which are partially shown as dashed lines in the figure. The auxiliary controller 919 operates a minimum necessary function of the smartphone 900, for example, in a sleep mode.

In the smartphone 900 illustrated in FIG. 21, one or more of the components comprised in the processing circuitry 110 (the selecting unit 111, the transmitting unit 112, and the receiving unit 113) described with reference to FIG. 2 may be implemented in the radio communication interface 912. Alternatively, at least some of these components may also be implemented in the processor 901 or the auxiliary controller 919. As an example, the smartphone 900 may mount a module including a part (for example, the BB processor 913) or the entire radio communication interface 912, the processor 901 and/or the auxiliary controller 919, and the information acquisition unit 241 and the control unit 243 may be implemented in the module. In this case, the module may store a program (in other words, a program causing the processor to execute operations of the information acquisition unit 241 and the control unit 243) causing the processor to function as the information acquisition unit 241 and the control unit 243, and execute the program. As another example, a program causing the processor to function as the information acquisition unit 241 and the control unit 243 may be installed in the smartphone 900, and the radio communication interface 912 (for example, the BB processor 913), the processor 901 and/or the auxiliary controller 919 may execute the program. As described above, as a device including the information acquisition unit 241 and the control unit 243, the smartphone 900 or the module may be provided. A program causing the processor to function as the information acquisition unit 241 and the control unit 243 may also be provided.

In addition, in the smartphone 900 illustrated in FIG. 21, for example, the communication unit 120 described with reference to FIG. 2 may be implemented in the radio communication interface 912 (for example, the RF circuit 914).

(Second Application)

Figure 22:
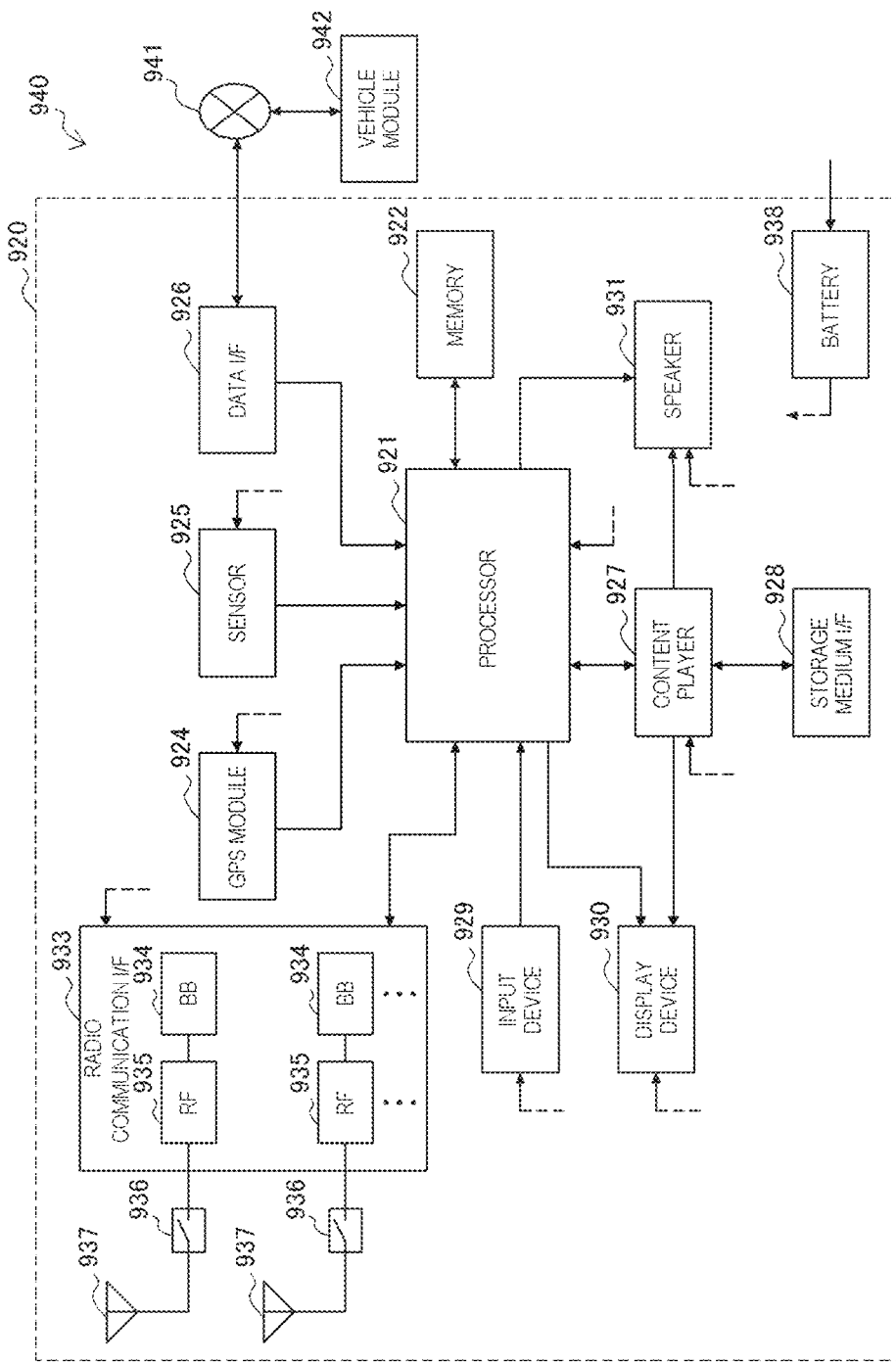
FIG. 22 is a block diagram illustrating an example of a schematic configuration of a car navigation device according to an embodiment of the present disclosure.

FIG. 22 is a block diagram illustrating an example of a schematic configuration of a car navigation device 920 to which an embodiment of the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 22. Although FIG. 22 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation device 920 may include the multiple antennas 937, as illustrated in FIG. 22. Although FIG. 22 illustrates the example in which the car navigation device 920 includes the multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 22 via feeder lines that are partially shown as dashed lines in the figure. The battery 938 accumulates power supplied form the vehicle.

In the car navigation device 920 illustrated in FIG. 22, one or more of the components comprised in the processing circuitry 110 (the selecting unit 111, the transmitting unit 112, and the receiving unit 113) described with reference to FIG. 2 may be implemented in the radio communication interface 933. Alternatively, at least some of these components may also be implemented in the processor 921. As an example, the car navigation device 920 may mount a module including a part (for example, the BB processor 934) or the entire radio communication interface 933 and/or the processor 921, and the information acquisition unit 241 and the control unit 243 may be implemented in the module. In this case, the module may store a program (in other words, a program causing the processor to execute operations of the information acquisition unit 241 and the control unit 243) causing the processor to function as the information acquisition unit 241 and the control unit 243, and execute the program. As another example, a program causing the processor to function as the information acquisition unit 241 and the control unit 243 may be installed in the car navigation device 920, and the radio communication interface 933 (for example, the BB processor 934) and/or the processor 921 may execute the program. As described above, as a device including the information acquisition unit 241 and the control unit 243, the car navigation device 920 or the module may be provided. A program causing the processor to function as the information acquisition unit 241 and the control unit 243 may also be provided.

In addition, in the car navigation device 920 illustrated in FIG. 22, for example, the communication unit 120 described with reference to FIG. 2 may be implemented in the radio communication interface 933 (for example, the RF circuit 935). In addition, the antenna unit 210 may be implemented in the antenna 937.

Embodiments of the technology of the present disclosure may also be realized as an in-vehicle system (or a vehicle) 940 including one or more blocks of the car navigation device 920, the in-vehicle network 941, and a vehicle module 942. That is, as a device including the information acquisition unit 241 and the control unit 243, the in-vehicle system (or the vehicle) 940 may be provided. The vehicle module 942 generates vehicle data such as vehicle speed, engine speed, and trouble information, and outputs the generated data to the in-vehicle network 941.

5-2. Application Related to Access Point (First Application)

Figure 23:
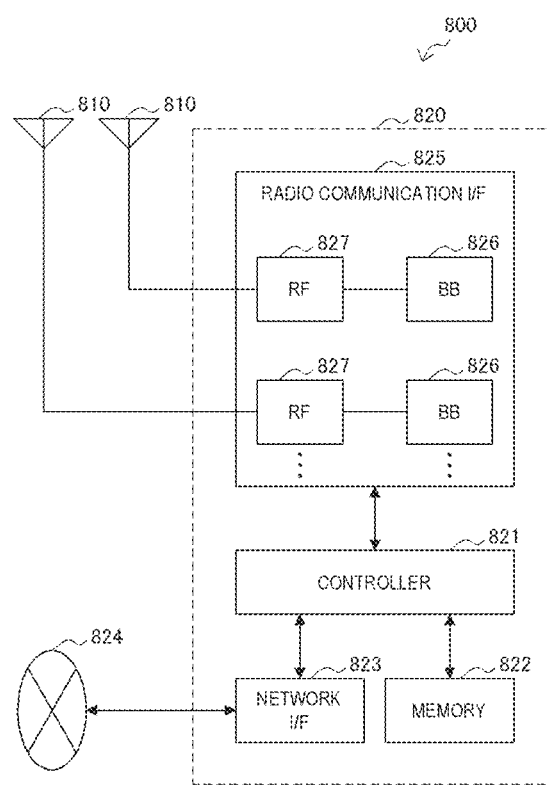
FIG. 23 is a block diagram showing a first example of a schematic configuration of an eNB according to an embodiment of the present disclosure.

FIG. 23 is a block diagram illustrating a first example of a schematic configuration of an access point to which an embodiment of the technology of the present disclosure may be applied. In the figure, the access point is denoted as eNB 800. The eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 23. For example, the multiple antennas 810 may be compatible with multiple frequency bands used by the eNB 800. Although FIG. 23 illustrates the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 23. For example, the multiple BB processors 826 may be compatible with multiple frequency bands used by the eNB 800. The radio communication interface 825 may include the multiple RF circuits 827, as illustrated in FIG. 23. For example, the multiple RF circuits 827 may be compatible with multiple antenna elements. Although FIG. 23 illustrates the example in which the radio communication interface 825 includes the multiple BB processors 826 and the multiple RF circuits 827, the radio communication interface 825 may also include a single BB processor 826 or a single RF circuit 827.

In the eNB 800 illustrated in FIG. 23, one or more of the components (the transmitting unit 211 and the receiving unit 212) of the processing circuit 210 described with reference to FIG. 3 may be implemented in the radio communication interface 825. Alternatively, at least some of these components may also be implemented in the controller 821. As an example, the eNB 800 may mount a module including a part (for example, the BB processor 826) or the entire radio communication interface 825 and/or the controller 821, and the control unit 153 (and the information acquisition unit 151) may be implemented in the module. In this case, the module may store a program (in other words, a program causing the processor to execute operations of the control unit 153 (and the information acquisition unit 151)) causing the processor to function as the control unit 153 (and the information acquisition unit 151), and execute the program. As another example, a program causing the processor to function as the control unit 153 (and the information acquisition unit 151) may be installed in the eNB 800, and the radio communication interface 825 (for example, the BB processor 826) and/or the controller 821 may execute the program. As described above, as a device including the control unit 153 (and the information acquisition unit 151), the eNB 800, the base station device 820 or the module may be provided. A program causing the processor to function as the control unit 153 (and the information acquisition unit 151) may also be provided. In addition, a readable recording medium in which the program is recorded may be provided.

In addition, in the eNB 800 illustrated in FIG. 23, the communication unit 120 described with reference to FIG. 3 may be implemented in the radio communication interface 825 (for example, the RF circuit 827). In addition, the communication unit 120 may be implemented in the controller 821 and/or the network interface 823.

(Second Application)

Figure 24:
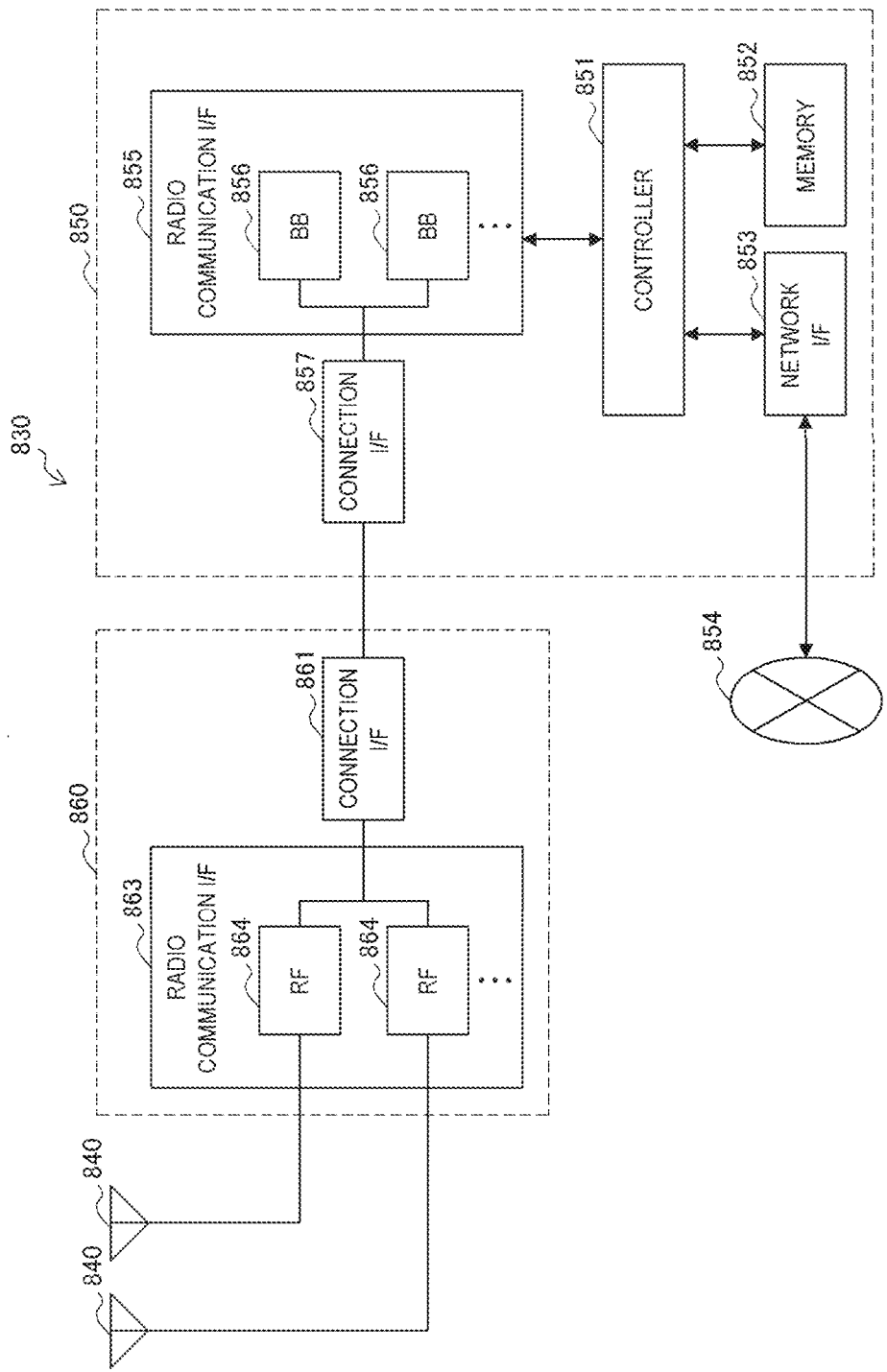
FIG. 24 is a block diagram showing a second example of a schematic configuration of an eNB according to an embodiment of the present disclosure.

FIG. 24 is a block diagram illustrating a second example of a schematic configuration of an access point to which an embodiment of the technology of the present disclosure may be applied. In the figure, the access point is denoted as eNB 830. The eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 24. For example, the multiple antennas 840 may be compatible with multiple frequency bands used by the eNB 830. Although FIG. 24 illustrates the example in which the eNB 830 includes the multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 23.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 23, except the BB processor 856 is connected to the RF circuit 864 of the RRH 860 via the connection interface 857. The radio communication interface 855 may include the multiple BB processors 856, as illustrated in FIG. 24. For example, the multiple BB processors 856 may be compatible with multiple frequency bands used by the eNB 830. Although FIG. 24 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 24. For example, the multiple RF circuits 864 may support multiple antenna elements. Although FIG. 24 illustrates the example in which the radio communication interface 863 includes the multiple RF circuits 864, the radio communication interface 863 may also include a single RF circuit 864.

In the eNB 830 illustrated in FIG. 24, one or more of the components (the transmitting unit 211 and the receiving unit 212) of the processing circuit 210 described with reference to FIG. 3 may be implemented in the radio communication interface 855 and/or the radio communication interface 863. Alternatively, at least some of these components may also be implemented in the controller 851. As an example, the eNB 830 may mount a module including a part (for example, the BB processor 856) or the entire radio communication interface 855 and/or the controller 851, and the control unit 153 (and the information acquisition unit 151) may be implemented in the module. In this case, the module may store a program (in other words, a program causing the processor to execute operations of the control unit 153 (and the information acquisition unit 151)) causing the processor to function as the control unit 153 (and the information acquisition unit 151), and execute the program. As another example, a program causing the processor to function as the control unit 153 (and the information acquisition unit 151) may be installed in the eNB 830, and the radio communication interface 855 (for example, the BB processor 856) and/or the controller 851 may execute the program. As described above, as a device including the control unit 153 (and the information acquisition unit 151), the eNB 830, the base station device 850 or the module may be provided. A program causing the processor to function as the control unit 153 (and the information acquisition unit 151) may also be provided. In addition, a readable recording medium in which the program is recorded may be provided.

In addition, in the eNB 800 illustrated in FIG. 24, for example, the communication unit 120 described with reference to FIG. 3 may be implemented in the radio communication interface 825 (for example, the RF circuit 827). In addition, the communication unit 120 may be implemented in the controller 821 and/or the network interface 823.

6. Conclusion

In an embodiment of the present disclosure, a coordinated transmission system established by a user equipment is proposed in which the cooperation manner is no longer determined by the conventional access point but it is the user equipment itself that determines the cooperation manner of the access points providing service for it. Therefore, CoMP technology can be applied to the network with the user equipment as its the center.

In addition, in the user equipment-centric coordinated transmission system according to the embodiment of the present disclosure, the user equipment selects the data distribution center and coordinated access points to perform coordinated transmission for it so as to establish a coordinated transmission system, and as compared with the conventional CoMP in which the access point of the cell to which the user equipment belongs determined whether and how to transmit the data jointly to the user equipment, it is not necessary for the user equipment to transmit a measurement report of the state of the surrounding access points to the access points or the serving gateway, thus simplifying the flowpath of the process, shortening the processing time and saving communication resources.

In addition, a user equipment-centric coordinated transmission system of embodiments of the present disclosure utilizes communication between access points. In an embodiment of the present disclosure, the user equipment selects one of the access points as the data distribution center, the serving gateway transmits the data of the user equipment to the data distribution center only, and the data distribution center distributes the data to the coordinated access points, which then, together with the data distribution center, transmit the data to the user equipment. Therefore, the serving gateway does not have to repeatedly transmit data to the coordinated access points. In user equipment-centric networks, wired communications or wireless communications utilizing a large amount of available spectrum, such as in the millimeter-wave band, may be used to enable communication between access points and, thus the data transmission speed between the access points is faster than that achieved by wireless backhaul through the S1 interface between the service gateway and the access points. Therefore, as compared to the repeated transmission of the data of the user equipment by the serving gateway to each of the coordinated access points, the wireless communication resources between the serving gateway and the access points can be saved, the transmission efficiency can be increased, and the data delay can be reduced.

Further, according to the embodiment of the present disclosure, the dynamic updating mechanism of the access point of the user equipment-centric coordinated transmission system can effectively enable the multi-point cooperation to adaptively adapt the user equipment's continuously moving transmission scenario. Furthermore, the internal switching mechanism of the data distribution center of the user equipment-centric coordinated transmission system according to the embodiments of the present disclosure can effectively deal with scenarios where the user equipment moves, greatly reducing the number of the switching of the data distribution center and greatly reducing the delay caused by the switching of the data distribution center.

The example in which the communication system is a system conforming to LTE or LTE-A has been described, but an embodiment of the present disclosure is not limited thereto. For example, the communication system may be a system conforming to another communication standard. In this case, the UE may be another terminal device and the access point may be another base station.

Reference in the specification to "an embodiment," or similar language, means that a particular feature, structure, or characteristic described in connection with the embodiment is included in at least one embodiment of the present disclosure. Therefore, the appearances of terms "in the embodiments of the present disclosure" and similar expressions do not necessarily refer to the same embodiment.

Those skilled in the art will appreciate that the present disclosure is implemented as a system, apparatus, method, or computer readable medium as a computer program product. Accordingly, the present disclosure may be embodied in various forms, for example, an entirely hardware embodiment, an entirely software embodiment (including firmware, resident software, micro-program code, etc.), or embodiment as an implementation of software and hardware, which will be referred to as "circuit", "module" or "system." In addition, the present disclosure may also be embodied as a computer program product having computer-usable program code stored thereon in any form of tangible media.

The related description of the present disclosure will be described with reference to the flowchart and/or block diagrams of systems, devices, methods, and computer program products according to embodiments of the present disclosure. It will be understood that each block of each flowchart and/or block diagram, and any combination of blocks in the flowchart illustrations and/or block diagrams, may be implemented using computer program instructions. These computer program instructions may be executed by a general purpose computer or a special computer processor or other programmable data processing apparatus and the instructions are executed via a computer or other programmable data processing apparatus to implement flowcharts and/or block diagrams In the description of the function or operation.

In the drawings are flowcharts and block diagrams illustrating the structure, functionality, and operation of systems, apparatuses, methods, and computer program products according to various embodiments of the present disclosure. Thus, each block of the flowchart illustrations or block diagrams may represent a single block, block, or section of program code that includes one or more executable instructions to implement a designated logical function. Additionally, it should be noted that in some other embodiments, the functions described by the blocks may not be performed in the order shown in the figures. For example, two blocks which are connected in the drawings may in fact be executed at the same time or may be executed in the reverse order in some cases according to the functions involved. Further note that the blocks of each block diagram and/or flowchart, and combinations of blocks in the block diagrams and/or flowchart illustrations, may be implemented by special purpose hardware based systems or may perform specific functions or operations by the combinations of dedicated hardware and computer instructions.

The invention claimed is:

1. An electronic device, comprising:
processing circuitry, configured to:
from a plurality of available access points, select one or more available access points as a group of one or more coordinated access points and select one available access point as a data distribution center,
transmit information about the one or more coordinated access points to the data distribution center, such that in response to receipt of data with the electronic device as destination from a service gateway, the data distribution center transmits the data with the electronic device as destination to the one or more coordinated access points,
when receiving the data with the electronic device as destination, receive the data with the electronic device as destination via the coordinated transmission of the data distribution center and the one or more coordinated access points, and
after the group of the one or more coordinated access points has been selected, update the group of the one or more coordinated access points by at least one of removing one of the one or more coordinated access points or adding a new access point to the group of the one or more coordinated access points.

2. The electronic device according to claim 1, wherein the processing circuitry is further configured to obtain predicted service quality of each of the plurality of available access points, and select the coordinated access points and the data distribution center.

3. The electronic device according to claim 2, wherein the predicted service quality is based on at least one of:
- channel quality between the access point and the electronic device;
- inherent parameters of the access point;
- current status information of the access point; or
- resources which is predicted to be assigned to the electronic device by the access point.

4. The electronic device according to claim 3, wherein the processing circuitry is further configured to preferably consider the channel quality between the access point and the electronic device when selecting the coordinated access points and the data distribution center.

5. The electronic device according to claim 4, wherein the processing circuitry is further configured to subsequently consider the resources which are predicted to be assigned to the electronic device by the access point when selecting the coordinated access points.

6. The electronic device according to claim 4, wherein the processing circuitry is further configured to subsequently consider the inherent parameters of the access point when selecting the coordinated access points.

7. The electronic device according to claim 3, wherein the processing circuitry is further configured to select the data distribution center from the selected coordinated access points based on the inherent parameters of the access point.

8. The electronic device according to claim 1, wherein the processing circuitry is further configured to receive the identification signal of the access points and identify the available access points based on the received identification signal of the access points.

9. The electronic device according to claim 1, wherein the processing circuitry is further configured to:
- determine whether to release a coordinated access point based on current service quantity of the coordinated access point,
- in response to the determination of releasing the coordinated access point; transmit information of the released coordinated access point to the data distribution center, such that in response to the receipt of data with the electronic device as destination, the data distribution center does not transmit the data with the electronic device as destination to the coordinated access points.

10. The electronic device according to claim 1, wherein the processing circuitry is further configured to:
- select one or more of the available access points as additional coordinated access points,
- transmit information about the additional coordinated access points to the data distribution center, such that in response to the receipt of data with the electronic device as destination, the data distribution center further transmits the data with the electronic device as destination to the additional coordinated access points, and
- when receiving the data with the electronic device as destination, receive the data with the electronic device as destination via the coordinated transmission of the data distribution center and the coordinated access points including the additional coordinated access point.

11. The electronic device according to claim 1, wherein the processing circuitry is further configured to do not select additional coordinated access points in a case that number of the coordinated access points reaches limits.

12. The electronic device according to claim 1, wherein the processing circuitry is further configured to:
- determine Whether to switch the data distribution center based on current service quantity of the data distribution center,
- in response to the determination of switching the data distribution center, transmit, select one of the coordinated access points as new data distribution center,
- transmit information about the one or more coordinated access points to the new data distribution center, such that in response to the receipt of data with the electronic device as destination, the new data distribution center transmits the data with the electronic device as destination to the one or more coordinated access points, and
- release the original data distribution center.

13. The electronic device according to claim 12, wherein the processing circuitry is further configured to switch the data distribution center only in a case that the current service quantity of the data distribution center decreases below a threshold.

14. A electronic device, comprising:
processing circuitry, configured to:
- in a case that the electronic device is selected as data distribution center by user equipment,
- transmit information about the user equipment and the data distribution center to a service gateway,
- receive information about coordinated access points from the user equipment,
- in response to receipt of data with the electronic device as destination from the service gateway, transmit the data with the electronic device as destination to the user equipment and the coordinated access points, such that the data with the electronic device as destination is transmitted to the user equipment via the coordinated transmission of the data distribution center and the coordinated access points,
- in a case that the electronic device is selected as the coordinated access points by the user equipment,
- in response to the receipt of data with the electronic device as destination, transmit the data with the electronic device as destination to the user equipment, such that the data with the electronic device as destination is transmitted to the user equipment via the coordinated transmission of the data distribution center and the coordinated access points, and
- after receiving the information about the coordinated access points receive updated information about the coordinated access points, the updated information updating the information about the coordinated access points by at least one of removing one of the coordinated access points or adding a new access point to the coordinated access points.

15. The electronic device according to claim 14, wherein the processing circuitry is configured to, in the case that the electronic device is selected as data distribution center, communicate with the coordinated access points to confirm resource scheduling of the coordinated transmission.

16. A communication method, comprising:
- from a plurality of available access points, selecting, by a user equipment, one or more available access points as one or more coordinated access points and selecting one available access point as a data distribution center,
- transmitting, by the user equipment, information about the one or more coordinated access points to the data distribution center, such that in response to receipt of data with the user equipment as destination from the service gateway, the data distribution center transmits the data with the user equipment as destination to the one or more coordinated access points, when the user equipment receives the data with the user equipment as destination, receiving the data with the user equipment as destination via the coordinated transmission of the data distribution center and the one or more coordinated access points, and after the one or more coordinated access points have been selected, updating the one or more coordinated access points by at least one of removing one of the one or more coordinated access points or adding a new access point to the one or more coordinated access points.

17. A communication method, comprising:

in a case that an access point is selected as data distribution center by user equipment, transmitting, by the data distribution center, information about the user equipment and the data distribution center to a service gateway, receiving, by the data distribution center, information about coordinated access points from the user equipment, in response to receipt of data with the user equipment as destination from the service gateway by the data distribution center, transmitting, by the data distribution center, the data with the user equipment as destination to the user equipment and the coordinated access points, such that the data with the user equipment as destination is transmitted to the user equipment via the coordinated transmission of the data distribution center and the coordinated access points, in a case that the access point is selected as the coordinated access points by the user equipment, in response to receipt of data with the user equipment as destination by the coordinated access points, transmitting, by the coordinated access points, the data with the user equipment as destination to the user equipment, such that the data with the user equipment as destination is transmitted to the user equipment via the coordinated transmission of the data distribution center and the coordinated access points, and after receiving the information about the coordinated access points receiving updated information about the coordinated access points, the updated information updating the information about the coordinated access points by at least one of removing one of the coordinated access points or adding a new access point to the coordinated access points.

18. A non-transitory computer readable medium, including executable instructions, which when executed by an information processing machine cause the information processing machine to execute a method according to claim 16.

19. A non-transitory computer readable medium, including executable instructions, which when executed by an information processing machine cause the information processing machine to execute a method according to claim 17.

* * * * *